US011496350B2

(12) United States Patent
Jamal et al.

(10) Patent No.: US 11,496,350 B2
(45) Date of Patent: Nov. 8, 2022

(54) DUAL-POLARIZATION FBMC IN WIRELESS COMMUNICATION SYSTEMS

(71) Applicant: UNIVERSITY OF SOUTH CAROLINA, Columbia, SC (US)

(72) Inventors: Hosseinali Jamal, Columbia, SC (US); David W. Matolak, Chapin, SC (US)

(73) Assignee: University of South Carolina, Columbia, SC (US)

(*) Notice: Subject to any disclaimer, the term of this patent is extended or adjusted under 35 U.S.C. 154(b) by 663 days.

(21) Appl. No.: 16/360,359

(22) Filed: Mar. 21, 2019

(65) Prior Publication Data

US 2022/0321391 A1  Oct. 6, 2022

Related U.S. Application Data

(60) Provisional application No. 62/797,990, filed on Jan. 29, 2019, provisional application No. 62/648,618, filed on Mar. 27, 2018.

(51) Int. Cl.
*H04L 27/26* (2006.01)
*H04J 11/00* (2006.01)
(Continued)

(52) U.S. Cl.
CPC ...... *H04L 27/2698* (2013.01); *H04J 11/0023* (2013.01); *H04L 5/0007* (2013.01);
(Continued)

(58) Field of Classification Search
CPC . H04L 27/2698; H04L 27/26; H04L 27/2602; H04L 27/34; H04L 27/26524; H04L 5/0007; H04J 11/0023
See application file for complete search history.

(56) References Cited

U.S. PATENT DOCUMENTS 3,511,936 A   5/1970  Saltzberg
5,651,028 A   7/1997  Harris et al.
(Continued)

FOREIGN PATENT DOCUMENTS

CA   2809915 A1 *  3/2011  ............ G10L 19/04
CN   102833206      12/2012
(Continued)

OTHER PUBLICATIONS

Arapoglou, et al. "To MIMO or Not To MIMO in Mobile Satellite Broadcasting Systems" *IEEE Transactions on Wireless Communications* 10(9) (2011) pp. 2807-2811.
(Continued)

*Primary Examiner* — Jean B Corrielus
(74) *Attorney, Agent, or Firm* — Dority & Manning, P.A.

(57) ABSTRACT

Conventional filter bank multi-carrier (FBMC) wireless communication systems offer superior spectral properties compared to the cyclic-prefix orthogonal frequency-division multiplexing (CP-OFDM) approach, at the cost of an inherent shortcoming in dispersive channels called intrinsic imaginary interference. In this disclosure the DP-FBMC system was disclosed. A DP-FBMC based communication system uses two orthogonal polarizations for wireless communication systems: dual-polarization FBMC (DP-FBMC). The system significantly suppresses FBMC intrinsic interference. For the disclosed DP-FBMC all the multicarrier techniques used in CP-OFDM systems for channel equalization etc., are applicable without using complex processing methods that are required for conventional FBMC. Disclosed DP-FBMC also is more robust in multipath fading channels, and also to receiver carrier frequency offset (CFO) and Timing offset (TO). In the disclosed DP-FBMC system, three different structures may be used based on different multiplexing techniques.

40 Claims, 17 Drawing Sheets

(51) Int. Cl.
H04L 5/00 (2006.01)
H04L 27/34 (2006.01)
(52) U.S. Cl.
CPC .......... *H04L 27/26* (2013.01); *H04L 27/2602* (2013.01); *H04L 27/26524* (2021.01); *H04L 27/34* (2013.01)

(56) References Cited

U.S. PATENT DOCUMENTS

| | | | |
|---|---|---|---|
| 5,793,797 | A | 8/1998 | Giallorenzi et al. |
| 5,805,584 | A | 9/1998 | Kingston et al. |
| 5,825,835 | A | 10/1998 | Kingston et al. |
| 6,810,028 | B1 | 10/2004 | Giallorenzi et al. |
| 7,672,453 | B1 | 3/2010 | Matolak |
| 7,881,361 | B2 | 2/2011 | Matolak |
| 7,933,343 | B2 | 4/2011 | Emami et al. |
| 8,184,993 | B2 | 5/2012 | Djordevia et al. |
| 8,472,813 | B2 | 6/2013 | Cvijetic et al. |
| 8,929,495 | B2 | 1/2015 | Mestre et al. |
| 10,050,684 | B2 * | 8/2018 | Qu .................... H04B 15/00 |
| 10,404,514 | B2 * | 9/2019 | Rakib ............... H04L 27/2646 |
| 2004/0125880 | A1 | 7/2004 | Emami et al. |
| 2009/0135888 | A1 | 5/2009 | Matolak |
| 2009/0324223 | A1 | 12/2009 | Liu |
| 2010/0215371 | A1 | 8/2010 | Djordevia et al. |
| 2011/0310951 | A1 | 12/2011 | Cvijetic et al. |
| 2014/0286384 | A1 | 9/2014 | Mestre et al. |
| 2015/0341200 | A1 * | 11/2015 | bin Mohd Yussof ... H04L 27/36 370/204 |
| 2017/0250776 | A1 | 8/2017 | Morsy-Osman et al. |
| 2017/0288926 | A1 | 10/2017 | Zhao et al. |
| 2017/0359204 | A1 | 12/2017 | Park et al. |
| 2020/0305010 | A1 * | 9/2020 | Hadani ................. H04L 5/0051 |

FOREIGN PATENT DOCUMENTS

| | | |
|---|---|---|
| CN | 103701753 | 4/2014 |
| CN | 104796371 | 7/2015 |
| CN | 106101045 | 11/2016 |
| CN | 106602233 | 4/2017 |
| CN | 106712903 | 5/2017 |
| CN | 106911395 | 6/2017 |
| CN | 107395544 | 11/2017 |
| CN | 107438038 | 12/2017 |
| EP | 2071754 | 6/2009 |
| EP | 2271022 | 1/2011 |
| EP | 2782304 | 9/2014 |
| KR | 20180008025 | 1/2018 |
| WO | WO 94/13077 | 6/1994 |
| WO | WO-2015189533 A1 * | 12/2015 ......... G10L 19/0204 |

OTHER PUBLICATIONS

Asplund, et al. "Propagation Characteristics of Polarized Radio Waves in Cellular Communications" *IEEE 66th Vehicular Technology Conference* (2007) pp. 839-843.
Bellanger, et al. "FBMC physical layer: a primer." *PHYDYAS* 4 (2010) pp. 1-31.
Cheng, et al. "Coordinated beamforming for the multi-user MIMO downlink using FBMC/OQAM" *6th Intl Symp on Comm, Control and Signal Processing* (2014) pp. 465-469. (Abstract only).
Cho, et al. "MIMO-OFDM Wireless Communications with MATLAB" *IEEE Press* (2010) pp. 1-46.
Coldrey, M. "Modeling and Capacity of Polarized MIMO Channels" *IEEE VTC Spring* (2008) pp. 440-444.
Erceg, et al. "Multiple-input multiple-output fixed wireless radio channel measurements and modeling using dual-polarized antennas at 2.5 GHz" *IEEE Transactions on Wireless Communications* 3(6) (2004) pp. 2288-2298.
Farhang-Boroujeny, B. "Filter Bank Multicarrier Modulation: A Waveform Candidate for 5G and Beyond" *Advances in Electrical Engineering* 2014:482805 (2014) pp. 1-25.

Farhang-Boroujeny, B. "OFDM Versus Filter Bank Multicarrier" *IEEE Signal Processing* 28(3) (2011) pp. 92-112.
Farhang-Boroujeny, et al. "Cosine modulated and offset QAM filter bank multicarrier techniques: a continuous-time prospect" *EURASIP J. Advances in Signal Processing* 2010:165654 (2010) pp. 1-16.
Giacoumidis, et al. "Dual-polarization multi-band optical OFDM transmission and transceiver limitations for up to 500 Gb/s uncompensated long-haul links" *Optics Express* 22 (2014) pp. 10975-10986.
Häring, L. "Intrinsic interference-aware adaptive FBMC transmission with automatic modulation classification" *IEEE 17th Intl Symp Comm and Inform Techn* (2017) pp. 1-6. (Abstract only).
Horlin, et al. "Dual-polarization OFDM-OQAM for communications over optical fibers with coherent detection" *Optics Express* 21 (2013) pp. 6409-6421.
Ihalainen, et al. "Channel Equalization for Multi-Antenna FBMC/OQAM Receivers" *IEEE Transactions on Vehicular Technology* 60(5) (2011) pp. 2070-2085.
ITU. "Report ITU-R M.2175: Simultaneous dual linear polarization transmission technique using digital cross-polarization cancellation for MSS systems" (2010).
ITU. "Report ITU-R M.1225: Guidelines for evaluation of radio transmission technologies for IMT-2000" (1997).
Jamal, et al. "PAPR Analysis for Dual-Polarization FBMC" *IEEE Communication Conference* (2018) pp. 1-5.
Javaudin, et al. "Pilot-aided channel estimation for OFDM/OQAM" *IEEE Spring Vehicular Tech. Conf* (2003) pp. 1581-1585.
Jayasinghe, et al. "Application of a leakage based precoding scheme to mitigate intrinsic interference in FBMC" *IEEE International Conference on Communications* (2013) pp. 5268-5272.
Jiang, et al. "Derivation of PAPR Distribution for OFDM Wireless Systems Based on Extreme Value Theory" *IEEE Tran. Wireless Comm.* 7(4) (2008) pp. 1298-1305.
Kim, et al. "Introduction to QAM-FBMC: From Waveform Optimization to System Design" *IEEE Communications* 54(11) (2016) pp. 66-73. (Abstract only).
Le Floch, et al. "Coded orthogonal frequency division multiplex" *Proceedings of the IEEE* 83(6) (1995) pp. 982-996.
Lélé, et al. "Channel estimation with scattered pilots in OFDM/OQAM" *IEEE 9th Workshop on Signal Proc. Adv. in Wireless Comm.* (2008) pp. 286-290. (Abstract only).
Lélé, et al. "Preamble-based channel estimation techniques for OFDM/OQAM over the powerline" *IEEE Intl. Symp. on Power Line Comm. and Its Appl.* (2007) pp. 59-64. (Abstract only).
Lempiainen, et al. "The performance of polarization diversity schemes at a base station in small/micro cells at 1800 MHz" *IEEE Transactions on Vehicular Technology* 47(3) (1998) pp. 1087-1092.
Maccartney, et al. "Indoor Office Plan Environment and Layout-Based mmWave Path Loss Models for 28 GHz and 73 GHz" *IEEE 83rd Vehicular Technology Conference* (2016) pp. 1-6.
Maccartney, et al. "Indoor Office Wideband Millimeter-Wave Propagation Measurements and Channel Models at 28 and 73 GHz for Ultra-Dense 5G Wireless Networks" *IEEE Access* 3 (2015) pp. 2388-2424.
Markel, J. "FFT pruning" *IEEE Transactions on Audio and Electroacoustics* 19(4) (1971) pp. 305-311. (Abstract only).
Matolak, et al. "Air—Ground Channel Characterization for Unmanned Aircraft Systems—Part I: Methods, Measurements, and Models for Over-Water Settings" *IEEE Transactions on Vehicular Technology* 66(1) (2017) pp. 26-44.
Mattera, et al. "Frequency domain CFO compensation for FBMC systems" *Signal Processing* 114 (2014) pp. 183-197. (Abstract only).
Mattera, et al. "Performance analysis of some timing offset equalizers for FBMC/OQAM systems" *Signal Processing* 108 (2015) pp. 167-182.
Molina-Garcia-Pardo, et al. "Polarized Indoor MIMO Channel Measurements at 2.45 GHz" *IEEE Transactions on Antennas and Propagation* 56(12) (2008) pp. 3818-3828.
Na, et al. "Low PAPR FBMC" *IEEE Transactions on Wireless Communications* 17(1) (2018) pp. 182-193. (Abstract only).

(56) References Cited

OTHER PUBLICATIONS

Neubauer, et al. "Simultaneous characterization of polarization matrix components in pico cells" *IEEE Vehicular Technology Conf.* 3 (1999) pp. 1361-1365. (Abstract only).

Nissel, et al. "Enabling Low-Complexity MIMO in FBMC-OQAM" *IEEE Globecom Workshops* (2016) pp. 1-6.

Oestges, et al. "Dual-polarized wireless communications: from propagation models to system performance evaluation" *IEEE Transactions on Wireless Communications* 7(10) (2008) pp. 4019-4031.

Oestges, et al. "Propagation modeling of MIMO multipolarized fixed wireless channels" *IEEE Transactions on Vehicular Technology* 53(3) (2004) pp. 644-654.

Sahin, et al. "A Survey on Multicarrier Communications: Prototype Filters, Lattice Structures, and Implementation Aspects" *IEEE Communications Surveys & Tutorials* 16(3) (2014) pp. 1312-1338.

Saltzberg, B. "Performance of an Efficient Parallel Data Transmission System" *IEEE Tran. Communication Technology* 15(6) (1967) pp. 805-811.

Schaich, et al. "Waveform contenders for 5G—OFDM vs. FBMC vs. UFMC" *IEEE 6th Intl. Symp. on Communications, Control and Signal Processing* (2014) pp. 457-460.

Siohan, et al. "Analysis and design of OFDM/OQAM systems based on filterbank theory" *IEEE Trans. Signal Processing* 50(5) (2002) pp. 1170-1183.

Skinner, D. "Pruning the decimation in-time FFT algorithm" *IEEE Transactions on Acoustics, Speech, and Signal Processing* 24(2) (1976) pp. 193-194. (Abstract only).

Soma, et al. "Analysis and modeling of multiple-input multiple-output (MIMO) radio channel based on outdoor measurements conducted at 2.5 GHz for fixed BWA applications" *IEEE International Conference on Communications* (2002) pp. 272-276.

Sorensen, et al. "Efficient computation of the DFT with only a subset of input or output points" *IEEE Transactions on Signal Processing* 41(3) (1993) pp. 1184-1200. (Abstract only).

Wang, et al. "Intrinsic Interference Elimination for Preamble-Based Channel Estimation in FBMC Systems" *IEEE Globecom Workshops* (2016) pp. 1-5. (Abstract only).

Wang, et al. "A Novel QAM-FBMC without Intrinsic Time-Domain Interference" *IEEE 84th Vehicular Technology Conference* (2016) pp. 1-6. (Abstract only).

Zakaria, et al. "A Novel Filter-Bank Multicarrier Scheme to Mitigate the Intrinsic Interference: Application to MIMO Systems" *IEEE Transactions on Wireless Communications* 11(3) (2012) pp. 1112-1123.

Zayani, et al. "WOLA-OFDM: A Potential Candidate for Asynchronous 5G" *IEEE Globecom Workshops* (2016) pp. 1-5. (Abstract only).

Zhang, et al. "On the Waveform for 5G" *IEEE Communications* 54(11) (2016) pp. 74-80. (Abstract only).

Zyren, et al. "Overview of the 3GPP long term evolution physical layer" *Freescale Semiconductor, Inc.* (2007) pp. 1-27.

\* cited by examiner

DUAL-POLARIZATION FBMC IN WIRELESS COMMUNICATION SYSTEMS

PRIORITY CLAIM

This application claims the benefit of previously filed U.S. Provisional Patent Applications, both entitled "Dual-Polarization FBMC in Wireless Communication Systems," respectively assigned U.S. Ser. No. 62/648,618, filed Mar. 27, 2018, and assigned U.S. Ser. No. 62/797,990, filed Jan. 29, 2019, and both of which are fully incorporated herein by reference for all purposes.

STATEMENT REGARDING FEDERALLY SPONSORED RESEARCH OR DEVELOPMENT

This presently disclosed subject matter was made with government support under Grant No. NNX17AJ94A, awarded by NASA per Grant/Contract/Project Title 15530-FB76. The government has certain rights in the presently disclosed subject matter.

BACKGROUND OF THE PRESENTLY DISCLOSED SUBJECT MATTER

The orthogonal frequency division multiplexing (OFDM) modulation technique with the cyclic prefix (CP) extension is, at present, the most widespread multicarrier communication system due to its relative simplicity and robustness against multipath frequency selective channels thanks to the CP. Yet this inserted CP decreases the spectral efficiency, especially in highly dispersive channels. Furthermore, because of the symbol-time-limited pulses, the OFDM spectrum is not compact and has large spectral sidelobes, thus requiring a large number of guard subcarriers to reduce the out-of-band power emission, further decreasing spectral efficiency.

As an alternative approach to increase the spectral efficiency and offer a more compact power spectral density, filterbank multicarrier (FBMC) has been proposed[1]. The FBMC structure does not require a CP and has a very compact spectral shape due to filtering. In many cases, this can enhance the spectrum efficiency (throughput) significantly. FBMC has been studied and compared to CP-OFDM for future cellular communication networks such as 5G[5], [7], [10].

In the literature, several FBMC systems have been proposed and reviewed in recent years and are based on different structures[2]-[5]. In this disclosure, focus is on the most widespread and popular FBMC technique based on Saltzberg's method[6] (also known as staggered multi-toned (SMT) FBMC[2] or OFDM-OQAM). This method makes it possible to have symbol-rate spacing between adjacent subcarriers without intersymbol interference (ISI) and intercarrier interference (ICI) in distortionless channels by introducing a shift of half the symbol period between the in-phase and quadrature components of QAM symbols.

Thus, in FBMC, the subcarrier symbols are modulated with real offset-QAM (OQAM) symbols and the orthogonality conditions are considered only in the real domain[2]. According to this real orthogonality condition, FBMC incurs a shortcoming due to "intrinsic imaginary interference" in dispersive channels. In order to mitigate this interference, an interference cancellation method is used. In the literature, there are several proposals for estimating and mitigating intrinsic interference, but almost all of these techniques have higher complexity[8]-[9], [15]-[19], [20]-[24].

Polarization-division multiplexing (PDM) is a physical layer communication technique for multiplexing signals on electromagnetic waves of two orthogonal polarization signal states on the same carrier frequency. This technique has been proposed for microwave links such as satellite television to double the throughput[11], [12]. It has also been proposed for fiber optic communication using two orthogonal left- and right-hand circularly polarized light beams in the same light guide fiber[13], [14]. Using two orthogonal polarization signal states on the same carrier frequency in terrestrial and air-to-ground (AG) wireless communication environments will often not be practical due to the non-stability of antenna position and often rich scattering in the wireless channels and would require highly complex receivers to remove the interference from the finite and often small cross-polarization discrimination (XPD).

SUMMARY OF THE PRESENTLY DISCLOSED SUBJECT MATTER

The presently disclosed subject matter relates to the electrical field generally, and more particularly, to filterbank multicarrier (FBMC), orthogonal frequency division multiplexing (OFDM), orthogonal frequency division multiple access (OFDMA), and polarization multiplexing subject matter.

With reference to technical description, it is noted that FBMC offers superior spectral properties compared to cyclic-prefix orthogonal frequency-division multiplexing (CP-OFDM) at the cost of an inherent shortcoming in dispersive channels called intrinsic imaginary interference. In this presently disclosed subject matter, a new FBMC based communication system uses two orthogonal polarizations for wireless communication systems, i.e., dual-polarization FBMC (DP-FBMC). Using this system can significantly suppress the FBMC intrinsic interference. Therefore, in DP-FBMC, all the multicarrier techniques used in CP-OFDM systems for channel equalization, etc. should be easily applicable without using the complex processing methods required for conventional FBMC. DP-FBMC also has other interesting advantages over CP-OFDM and conventional FBMC—it is more robust in multipath fading channels, as well as to receiver carrier frequency offset (CFO) and timing offset (TO). In the presently disclosed DP-FBMC system, three different DP-FBMC structures are proposed based on different multiplexing techniques. This disclosure shows that compared to conventional FBMC, one of the DP-FBMC structures has equivalent complexity and equipment requirements. Per comparison results, the presently disclosed DP-FBMC has potential as a promising candidate for future wireless communication networks.

In less technical terms, the presently disclosed subject matter is a new wireless communication transmission (and corresponding reception) scheme that provides better performance than currently popular techniques. These techniques are called multi-carrier schemes, and the presently disclosed subject matter makes use of two non-interfering antennas (at both transmitter and receiver) to obtain the better performance. This multiple antenna technique solves an existing self-interference problem of FBMC to provide performance gains in the presence of multiple practical impairments.

In terms of applications, this presently disclosed subject matter can be used for multiple types of wireless communication links, including terrestrial (both indoor and outdoor), air-to-ground, satellite, and vehicular. In that sense, the presently disclosed subject matter can potentially be used for thousands (or millions) of wireless communications transmitters and receivers. In use, the presently disclosed subject matter has the opportunity to improve communication system reliability and increase usable data rate.

In general, it is a present object to provide improved communication system arrangements and associated methodology.

Further subject matter, broadly speaking, relates to respective methodology and device/system subject matter relating to transmitting, receiving, and communicating, respectively.

One presently disclosed exemplary embodiment may relate to a method of transmitting data via a filterbank multicarrier (FBMC) communication system, such method comprising receiving a plurality of information symbols; encoding an N×M array containing the plurality of information symbols into a dual-polarization array of modulation symbols; and transmitting the dual-polarization array of modulation symbols using two mutually orthogonal waveforms respectively transmitted via respective antenna. Per such method, FBMC intrinsic interference is relatively suppressed.

Another presently disclosed exemplary embodiment may relate to a method of receiving data transmitted over a communication channel, such method comprising receiving two mutually orthogonal waveforms on respective vertical and horizontal polarization (or other orthogonally polarized) receiver antennas; demodulating the two orthogonal waveforms to recover an estimate of a two-dimensional array of modulation symbols; and decoding the two-dimensional array of modulation symbols in order to generate an estimate of an N×M array containing a plurality of information symbols, the N×M array having been encoded prior to transmission of the orthogonal waveforms by using at least one of time-polarization division multiplexing (TPDM), frequency-polarization division multiplexing (FPDM), and time-frequency-polarization division multiplexing (TFPDM).

Still further, yet another presently disclosed exemplary embodiment may relate to a method of communicating data via a filterbank multicarrier (FBMC) communication system, such method comprising receiving a plurality of information symbols; encoding an N×M array containing the plurality of information symbols into a dual-polarization array of modulation symbols; transmitting the dual-polarization array of modulation symbols using two mutually orthogonal waveforms respectively transmitted via respective antenna; and subsequently receiving transmitted orthogonal waveforms.

Those of ordinary skill in the art will understand from the complete disclosure herewith that the present subject matter equally relates to apparatus and/or system subject matter that corresponds and/or relates to presently disclosed methodology, and vice versa. One exemplary such embodiment may relate to a data transmission device, comprising a wireless transmitter; a pair of respective transmission antenna; a processor; and a memory including program code executable by the processor, the program code including code for causing the processor to: receive a plurality of information symbols; encode an N×M array containing the plurality of information symbols into a dual-polarization array of modulation symbols; and transmit the dual-polarization array of modulation symbols using two mutually orthogonal waveforms respectively transmitted via said respective antenna.

Yet another exemplary embodiment may relate to a data receiver apparatus for receiving data transmitted over a communication channel, such apparatus comprising a receiver front end, the receiver front end being configured to receive two mutually orthogonal waveforms; a demodulator configured to generate an estimate of a two-dimensional array of modulation symbols; and a decoder operative for performing an inverse of encoding of an N×M array containing a plurality of information symbols, the N×M array having been encoded prior to transmission of the orthogonal waveforms by using at least one of time-polarization division multiplexing (TPDM), frequency-polarization division multiplexing (FPDM), and time-frequency-polarization division multiplexing (TFPDM).

Still further, yet another presently disclosed exemplary embodiment may relate to a filterbank multicarrier (FBMC) data communications system, comprising a wireless transmitter; a receiver; a pair of respective transmission antenna; a pair of respective receiving antenna; a processor; and a memory including program code executable by the processor, the program code including code for causing the processor to: receive a plurality of information symbols; encode an N×M array containing the plurality of information symbols into a dual-polarization array of modulation symbols; transmit the dual-polarization array of modulation symbols using two mutually orthogonal waveforms respectively transmitted via said respective transmission antenna; and subsequently receive transmitted orthogonal waveforms via said respective receiving antenna.

As presently disclosed, using the PDM technique, dual-polarization FBMC (DP-FBMC) is proposed not to double the capacity but rather to solve the intrinsic imaginary interference shortcoming of FBMC systems in dispersive channels. By using two polarizations in FBMC, basically another dimension is added to suppress the intrinsic interference. Transmitting symbols on two orthogonal polarizations reduces the interference by a large extent; however, in order to further suppress the remaining residual interference, one should choose prototype filters with near Nyquist characteristics, such as square root raised cosine (SRRC) filters.

Using different multiplexing techniques, three different DP-FBMC approaches are proposed: 1) time-polarization division multiplexing (TPDM); 2) frequency-polarization division multiplexing (FPDM); and 3) time-frequency-polarization division multiplexing (TFPDM). The difference in these methods is the location of transmitted FBMC OQAM symbols in the time, frequency, and polarization domains. In TPDM, one separates adjacent FBMC symbols on two orthogonal polarizations multiplexed in time. In FPDM, one separates adjacent subcarriers on two orthogonal polarizations multiplexed in frequency, and in TFPDM, one isolates symbols on two orthogonal polarizations multiplexed both in time and frequency. This disclosure shows that in the TPDM and TFPDM Structures, one can reduce the dominant adjacent-symbol impacts in both time and frequency that can cause intrinsic interference. This disclosure also shows that the proposed DP-FBMC has better bit error ratio (BER) performance in fading channels compared to both CP-OFDM and FBMC due to the increased temporal symbol separation on each polarization.

The remainder of this disclosure is organized as follows: Section I describes the OFDM-OQAM-based FBMC system model; Section II describes the proposed DP-FBMC OFDM-OQAM communication systems; and Section III provides simulation results and compares CP-OFDM, conventional FBMC and DP-FBMC systems' performance in three different communication channel scenarios: an air-to-ground (AG) channel based on NASA measurements, and the pedestrian "channel A" and "channel B" from ITU recommendations. It also compares peak-to-average power ratio (PAPR) and power spectral density (PSD), and evaluates the performance degradation in low XPD conditions.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

BRIEF DESCRIPTION OF THE FIGURES

A full and enabling disclosure of the presently disclosed subject matter, including the best mode thereof, to one of ordinary skill in the art, is set forth more particularly including the specification, and including reference to the accompanying in which.

Figure 1A:
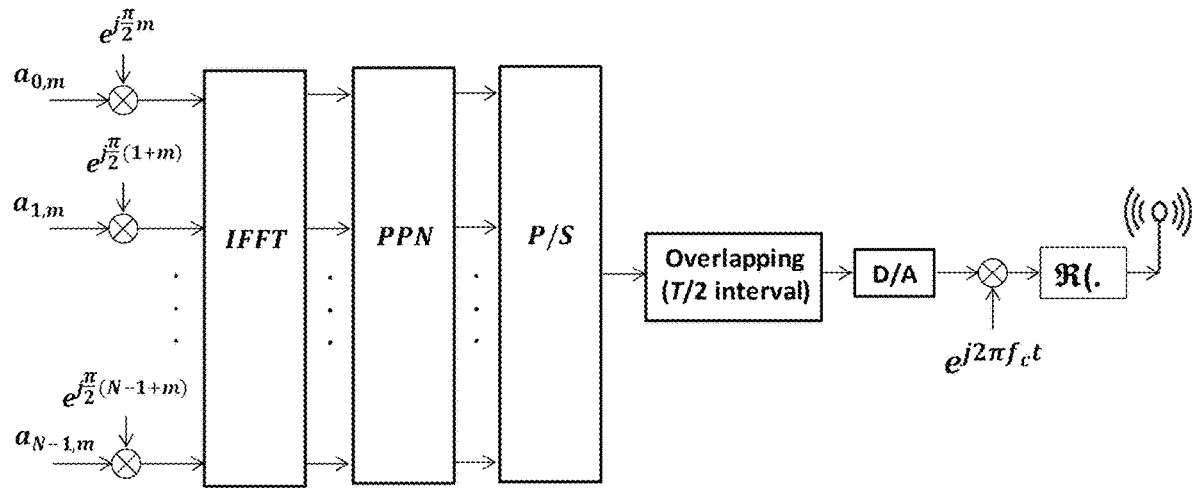
FIG. 1A is a schematic representation of an exemplary embodiment of a presently disclosed OQAM-OFDM (FBMC) communication system transmitter which exists in literature.

Repeat use of reference characters in the present specification and drawings is intended to represent the same or analogous features or elements or steps of the presently disclosed subject matter.

DETAILED DESCRIPTION OF THE PRESENTLY DISCLOSED SUBJECT MATTER

Reference will now be made in detail to various embodiments of the presently disclosed subject matter, one or more examples of which are set forth below. Each embodiment is provided by way of explanation of the subject matter, not limitation thereof. In fact, it will be apparent to those skilled in the art that various modifications and variations may be made in the presently disclosed subject matter without departing from the scope or spirit of the subject matter. For instance, features illustrated or described as part of one embodiment, may be used in another embodiment to yield a still further embodiment, and corresponding and/or associated methodologies may be practiced relative to apparatus disclosed and/or suggested herewith, all of which comprise various embodiments of the presently disclosed subject matter.

I. FBMC System Model

In the conventional OFDM-OQAM form of FBMC based on literature[2], [3], real valued OQAM symbols $a_{m,n}$ are filtered through prototype filter h(t) and then modulated across N subcarriers as described by the following continuous form equation, $$x(t) = \sum_{n=0}^{N-1} \sum_{m \in \mathbb{Z}} a_{n,m} h\left(t - m\frac{T}{2}\right) e^{j\frac{2\pi nt}{T}} e^{j\theta_{n,m}} \quad (1)$$

Prototype filter h(t) is a finite impulse response (FIR) filter with a length L=KN, with K defined as the overlapping factor. In this equation, $\theta_{n,m}=\pi/2$ (n+m) is a phase term between adjacent subcarriers and symbols to satisfy the orthogonality condition in the real domain at the receiver[2], [3]. According to Eq. (1), symbols are offset or overlapped by half a symbol duration, T/2. For implementation, to reduce the complexity, it has been shown that, a polyphase network (PPN) of prototype filters and fast and inverse fast Fourier transforms (FFT, IFFT) can be used, as shown in FIGS. 1A and 1B.[2,5,25] More specifically, FIG. 1A is a schematic representation of an exemplary embodiment of a presently disclosed OQAM-OFDM (FBMC) communication system transmitter, and FIG. 1B is a schematic representation of an exemplary embodiment of a presently disclosed OQAM-OFDM (FBMC) communication system receiver.

Figure 1B:
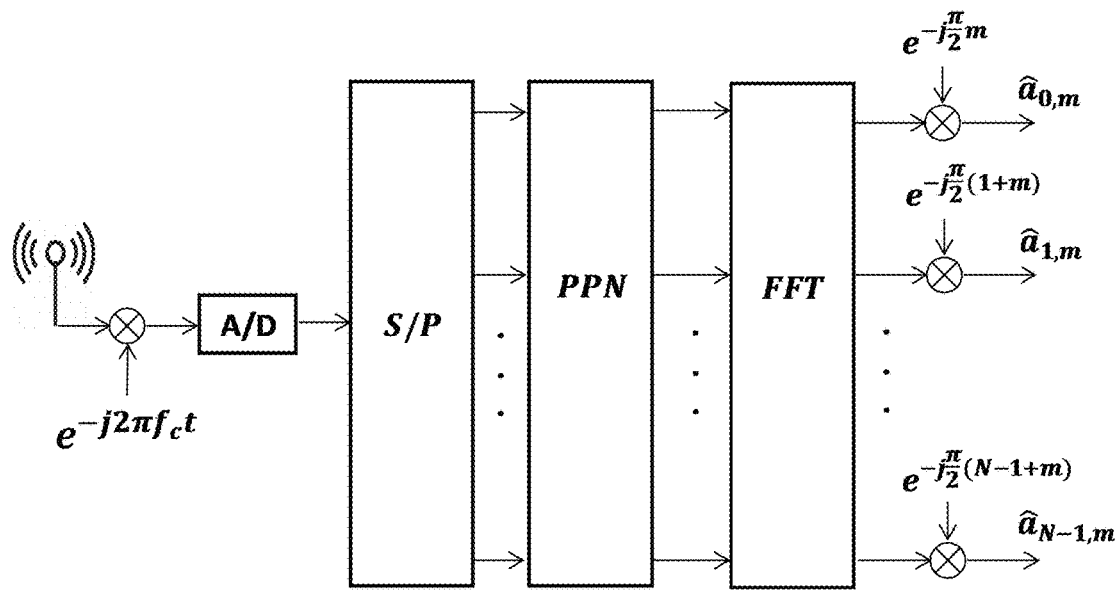
FIG. 1B is a schematic representation of an exemplary embodiment of a presently disclosed OQAM-OFDM (FBMC) communication system receiver which exists in literature.

In FIG. 1A, note that after the π/2 phase shifts in the FBMC transmitter, the IFFT input symbols are either purely real or purely imaginary values. After the IFFT block, subcarriers will be filtered through the PPN network, and for each block of N input subcarriers, what comes out of the parallel to serial (P/S) conversion is a signal vector with the same length as the prototype filter. These symbol vectors are then overlapped or offset by T/2 to achieve maximum spectral efficiency. In these Structures, the major processing complexities are due to the IFFT, FFT, and PPN blocks.

Figure 2:
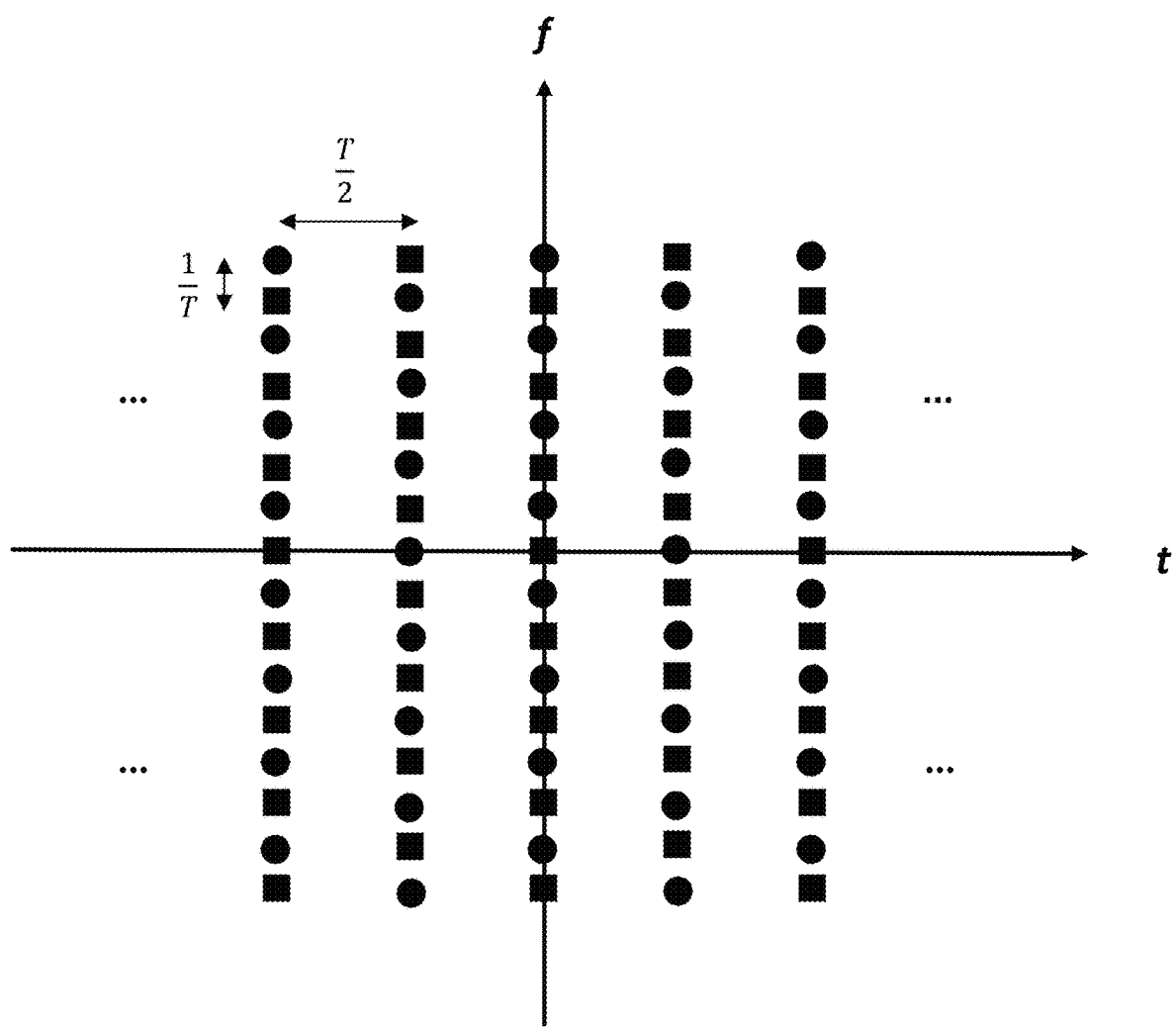
FIG. 2 illustrates FBMC symbols in a time-frequency phase-space lattice, where N=16.

FIG. 2 illustrates presently disclosed example of conventional FBMC OQAM symbols in a time-frequency phase-space lattice, where N=16. Circles and squares denote a relative π/2 phase shift between symbols adjacent in time and/or frequency. As such, FIG. 2 depicts a useful diagram (called a time-frequency phase-space lattice) to illustrate the transmitted symbols in time, frequency, and phase. This Figure shows the time-frequency lattice of conventional FBMC symbols for an example of 16 subcarriers. Note that all symbols adjacent in time or frequency have a π/2 phase shift between them (adjacent circles and squares) to satisfy the real orthogonality condition[2]. Thus, in perfect (i.e., distortionless) channel conditions, there is no ISI or ICI at the receiver.

As mentioned, one main shortcoming of FBMC compared to OFDM emanates from this real orthogonality, which will be violated in non-perfect channel conditions. This problem yields what is called intrinsic imaginary interference, and this makes the use of the straightforward OFDM channel equalization and MIMO techniques impractical in FBMC. In order to reduce this interference for channel equalization and MIMO purposes, several methods have been proposed in recent years. Among these techniques are scattered or auxiliary pilots[15], [16], preamble-based channel estimation[17], spreading techniques for MIMO applications[18], and per-subchannel equalizers based on the frequency sampling approach for multi-antenna receivers[19]. All of these methods add extra computational complexity at receivers. The presently disclosed subject matter shows that one can suppress the intrinsic imaginary interference in DP-FBMC systems very effectively without any extra processing, achieving suppression by using dual polarization and the suggested SRRC prototype filter.

One first analyzes this intrinsic imaginary interference in conventional FBMC since this is useful to explain DP-FBMC as well. One rearranges Eq. (1) as follows, $$x(t) = \sum_{n=0}^{N-1} \sum_{m=-\infty}^{\infty} a_{n,m} Q_{n,m}(t) \quad (2)$$

where, $$Q_{n,m}(t) = h\left(t - m\frac{T}{2}\right) e^{j\frac{2\pi}{T}nt} e^{j\theta_{n,m}} \quad (3)$$

Here, the $Q_{n,m}(t)$ functions are the time- and frequency-shifted versions of the prototype filter h(t). Now, assuming a perfect channel, and with $\theta_{n,m}$ as described in Eq. (1), the real orthogonality condition can be expressed as, $$\Re\{\langle Q_{n,m}, Q_{p,q}\rangle\} = \Re\{\int Q_{n,m}(t) Q^*_{p,q}(t) dt\} = \delta_{n,p} \delta_{m,q} \quad (4)$$

where $\delta_{n,p}$ is the Kronecker delta, equal to 1 if n=p and 0 if n≠p. After some calculations, and assuming perfect synchronization, one can express the received symbol estimates as follows, $$\hat{a}_{n,m} = H_{n,m}(a_{n,m} + jI_{n,m}) - N_{n,m} \quad (5)$$

where $H_{n,m}$ denotes the complex channel transfer function sample at subcarrier n and symbol m, $I_{n,m}$ is the intrinsic interference, and $N_{n,m}$ is the additive white Gaussian noise (AWGN) variable at subcarrier n and symbol index m.

As long as $I_{n,m}$ is unknown at the receiver, the application of pilot scattering channel estimation, and therefore MIMO, is extremely complex. Therefore, for channel equalization and MIMO applications, one must mitigate this interference. Prior literature proposes the use of auxiliary symbols adjacent to actual pilots. These auxiliary symbols are the negative of $I_{n,m}$, and this effectively removes this interference[15,16]; however, these processing methods add slightly more complexity to the system. The presently disclosed subject matter shows that DP-FBMC Structures (except one) substantially suppress $I_{n,m}$ on all symbols without adding any more processing for channel equalization.

For calculating the $I_{n,m}$ values, one may define the filter time-frequency localization samples as follows, $$Q_{n,m}^{p,q} = -j\langle Q_{n,m}, Q_{p,q}\rangle = -j\{\int Q_{n,m}(t) Q^*_{p,q}(t) dt\} \quad (6)$$

According to Eqs. (4)-(6), one can easily state that the $Q_{n,m}^{p,q}$ values are purely real. From the purely real or imaginary symbols surrounding the transmitted symbols, one can calculate the intrinsic interference by the following summation, $$I_{n,m} = \Sigma_{(p,q) \in \vartheta_{\Delta n, \Delta m}} a_{n+p, m+q} Q_{n,m}^{p,q} \quad (7)$$

where, $$\vartheta_{\Delta n, \Delta m} = \{(p,q), |p| \leq \Delta n, |q| \leq \Delta m | H_{n+p, m+q} \cong H_{n,m}\} \quad (8)$$

Now, by defining each reference symbol $a_{o,o}$, $\vartheta_{\Delta n, \Delta m}$ is the set of nearby indices with within $\Delta n$ subcarriers and $\Delta m$ symbols of the reference subcarrier and symbol indices (n=0, m=0). This assumption is usually true as long as the channel has an approximately equal response on nearby subcarriers, which is often valid for a variety of practical channels and appropriately selected inter-subcarrier frequency separations. In practice, by choosing well-localized prototype filters, $\Delta n, \Delta m$ can be as small as $1^{[4]}$, which means most of the intrinsic interference comes from the adjacent subcarriers and symbols. Thus, interference from symbols outside the neighborhood ($\vartheta_{\Delta n, \Delta m}$) is negligible, i.e., $Q_{0,0}^{p,q}$ decreases as $\Delta n$ and $\Delta m$ increase.

II. Presently Disclosed DP-FBMC System Model

Figure 3:
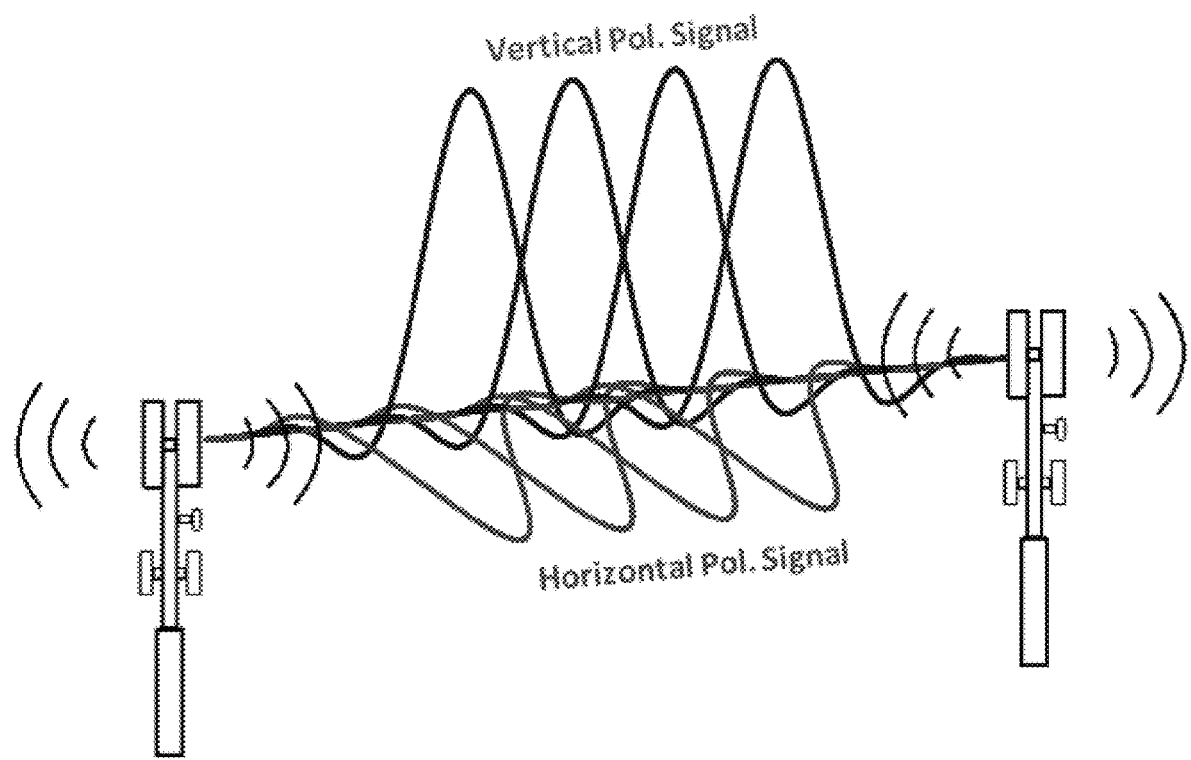
FIG. 3 illustrates an exemplary configuration of a presently disclosed DP-FBMC wireless communication link.

This Section using the PDM technique describes the presently disclosed dual polarization communication systems. FIG. 3 illustrates a dual polarization communication system using vertical and horizontal polarization antennas (Structure I, TPDM). Considered another way, FIG. 3 illustrates an exemplary configuration of a presently disclosed DP-FBMC wireless communication link.

Figure 4A:
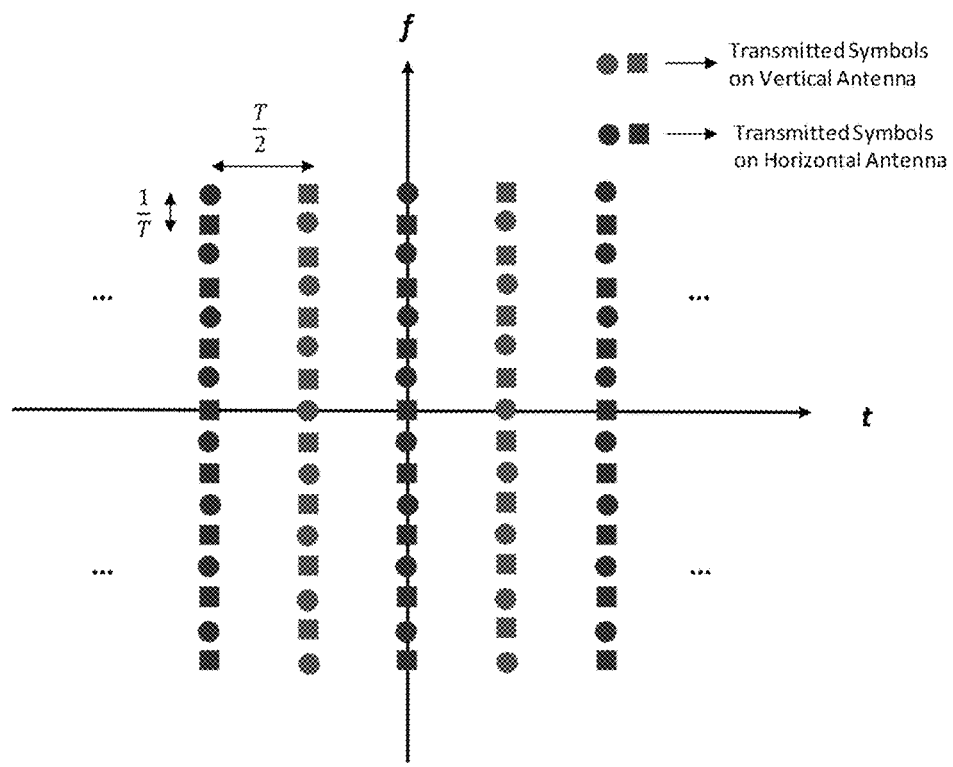
FIG. 4A illustrates an exemplary configuration of presently disclosed DP-FBMC symbols in a time-frequency-polarization phase-lattice, in a first embodiment of a Structure I based on TPDM.
Figure 4B:
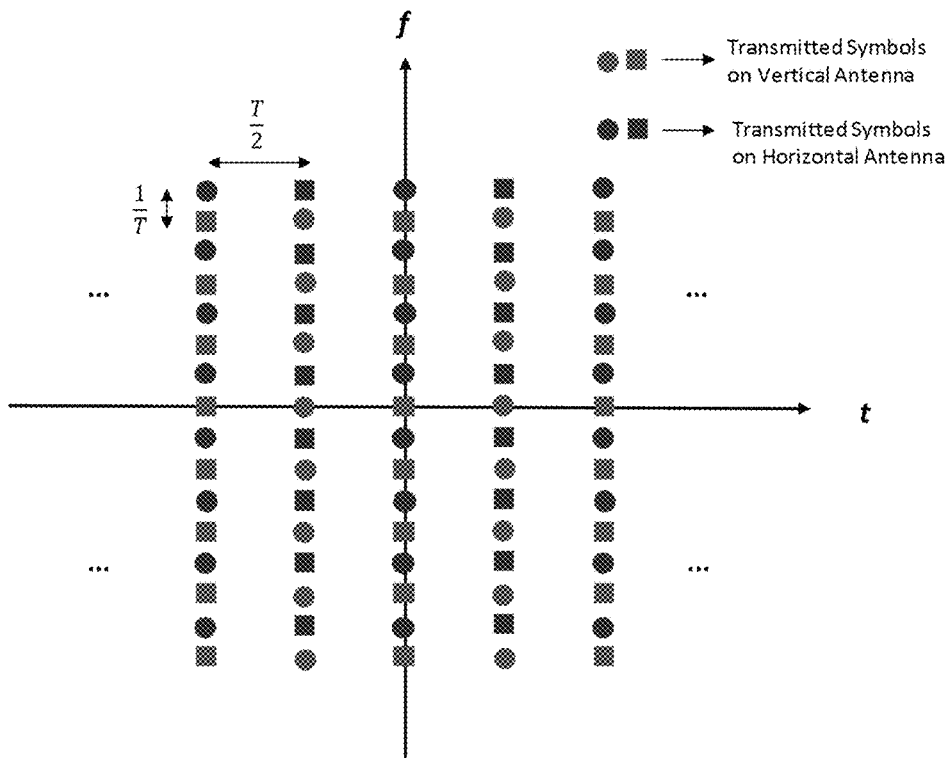
FIG. 4B illustrates an exemplary configuration of presently disclosed DP-FBMC symbols in a time-frequency-polarization phase-lattice, in a second embodiment of a Structure II based on FPDM.
Figure 4C:
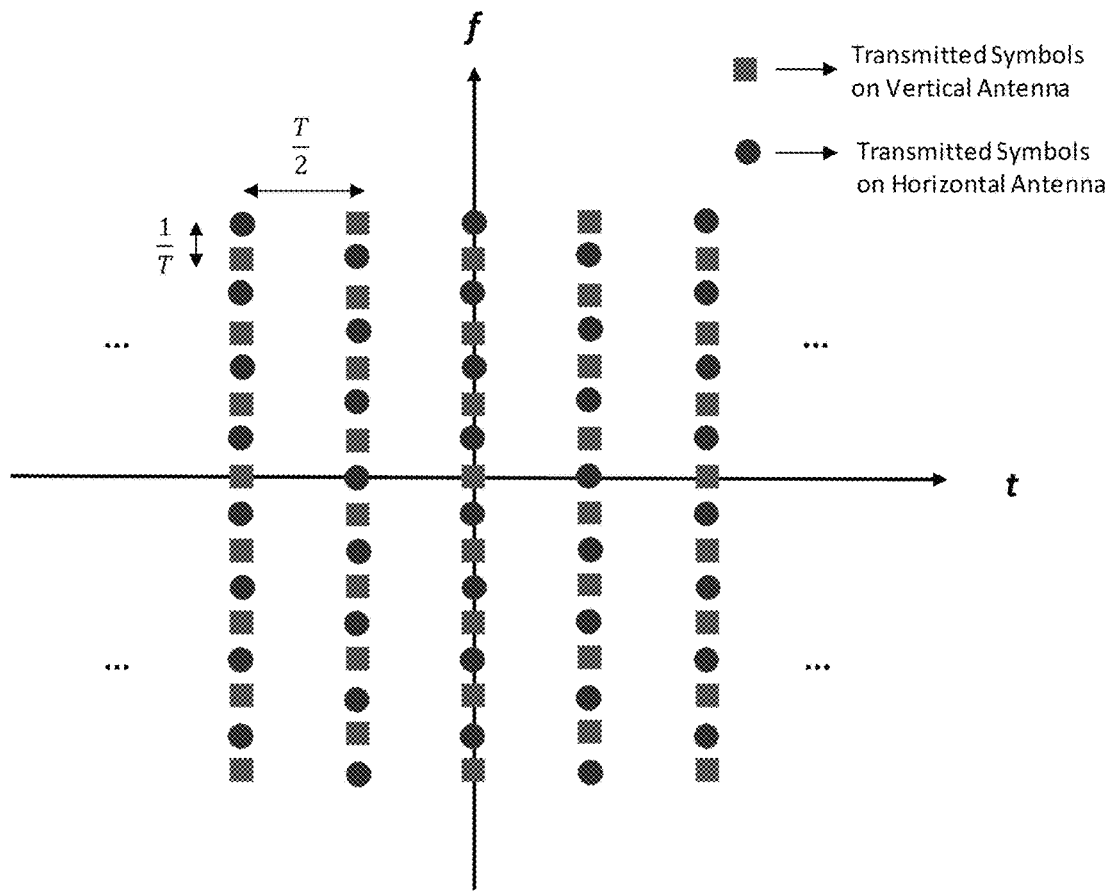
FIG. 4C illustrates an exemplary configuration of presently disclosed DP-FBMC symbols in a time-frequency-polarization phase-lattice, in a third embodiment of a Structure III based on TFPDM.

The presently disclosed DP-FBMC subject matter discloses three available multiplexing approaches. FIG. 4A illustrates an exemplary configuration of presently disclosed DP-FBMC symbols in a time-frequency-polarization phase-lattice, in a first embodiment of a Structure I based on TPDM. Transmitted symbols on horizontal antenna are represented by the first, third, and fifth column of features in FIG. 4B, while the second and fourth columns denote features for transmitted symbols on vertical antenna. FIG. 4B illustrates an exemplary configuration of presently disclosed DP-FBMC symbols in a time-frequency-polarization phase-lattice, in a second embodiment of a Structure II based on FPDM. Features (transmitted symbols) are illustrated in FIG. 4B in alternating rows, with symbols transmitted on horizontal antenna beginning on the first row and with symbols transmitted on vertical antenna beginning on the second row. FIG. 4C illustrates an exemplary configuration of presently disclosed DP-FBMC symbols in a time-frequency-polarization phase-lattice, in a third embodiment of a Structure III based on TFPDM. Features (transmitted symbols) are illustrated in FIG. 4C in alternating positions, with symbols transmitted on horizontal antenna beginning in the first position (far left on top row) and with symbols transmitted on vertical antenna beginning in the second position (second from the left on top row), meaning alternating rows have reverse positions as between respective horizontal and vertical antenna associated symbols.

Thus, while FIGS. 4A through 4C depict the time-frequency-polarization phase-lattice of all presently disclosed DP-FBMC Structures, FIG. 4A depicts, in particular, DP-FBMC Structure I based on TPDM. Per such methodology, one can separate or isolate adjacent symbols on two orthogonal polarizations by multiplexing symbols in time. By this approach, the intrinsic interference that results from (temporally) adjacent symbols can be removed; however, interference still exists from symbols on nearby subcarriers.

In the DP-FBMC Structure II based on FPDM, as shown in FIG. 4B, adjacent transmitting subcarriers are separated or isolated on two polarizations by multiplexing symbols in frequency. This method is not as useful as Structures I and III in removing intrinsic interference because most of the intrinsic interference comes from directly adjacent symbols on the same subcarrier index (at the same frequency, i.e., adjacent symbols on same row). Note that this method could also be used in OFDM.

FIG. 4C depicts the time-frequency-polarization phase-lattice structure of DP-FBMC Structure III based on TFPDM. In this Structure, one can transmit two halves of the OQAM symbols on two orthogonal polarizations at every symbol time, then subsequently switch the order of half the subcarriers on the two polarizations at the next symbol time. Basically, every other subcarrier is transmitted on a given polarization and the order is switched at each symbol interval. Hence, if polarization isolation is perfect, the majority of the intrinsic imaginary interference (from nearest neighbor symbols) will be removed.

To provide a numerical example, Table 1 shows the $Q_{0,0}^{p,q}$ intrinsic interference values surrounding each reference symbol ($a_{0,0}$) using a well-localized and widely studied prototype filter, the PHYDYAS filter with overlapping factor $K=8^{[25]}$. In this table, assuming Structure III for DP-FBMC, the italicized $Q_{0,0}^{p,q}$ values represent the time-frequency filter response on the same polarization as the reference symbol, and the bold $Q_{0,0}^{p,q}$ values are on the other polarization which produce no interference on the subject symbol (assuming perfect polarization isolation). Thus, the interference caused by adjacent subcarriers is suppressed significantly by the PDM technique, but there are still symbols (italicized) on the same polarization that can cause interference.

TABLE 1

PHYDYAS prototype filter $Q_{0,0}^{p,q}$ intrinsic interference values for p = [−2, 2], q = [−3, 3], and K = 8.

| | | | | q | | | |
|---|---|---|---|---|---|---|---|
| p | −3 | −2 | −1 | 0 | 1 | 2 | 3 |
| −2 | −0.0822j | 0 | 0 | 0 | 0 | 0 | −0.0822j |
| −1 | *0.0596j* | 0.1268j | *0.1912j* | 0.2181j | *0.1912j* | 0.1268j | *0.0596j* |
| 0 | −0.0822j | 0 | 0.5769j | $Q_{0,0}^{0,0}$ = 1 | −0.5769j | 0 | −0.0822j |
| 1 | *0.0596j* | −0.1268j | *0.1912j* | −0.2181j | *0.1912j* | −0.1268j | *0.0596j* |
| 2 | 0 | 0 | 0 | 0 | 0 | 0 | 0 |

To suppress this residual intrinsic interference, one can employ a different prototype filter. This disclosure turns to the classic SRRC filter with overlapping factor K. Via some numerical trials, it was determined heuristically that a roll-off factor $\alpha=2/K$ performs well (additional filter choices represent another area of future work). Tables 2 and 3 list the $Q_{0,0}^{p,q}$ intrinsic interference values surrounding the reference symbol for two example SRRC filter overlapping factors: K=8, 16. Note that the italicized $Q_{0,0}^{p,q}$ values for K=16 are approximately half those for the SRRC filter with K=8.

TABLE 2

SRRC prototype filter $Q_{0,0}^{p,q}$ values for p = [−2, 2], q = [−3, 3], K = 8, and α = 2/K = 0.25.

| | | | | q | | | |
|---|---|---|---|---|---|---|---|
| p | −3 | −2 | −1 | 0 | 1 | 2 | 3 |
| −2 | −0.1857j | 0 | 0 | 0 | 0 | 0 | −0.1857j |
| −1 | *0.0646j* | 0.0695j | *0.0725j* | 0.0735j | *0.0725j* | 0.0694j | *0.0646j* |
| 0 | 0.1857j | 0 | 0.6278j | $Q_{0,0}^{0,0}=1$ | −0.6279j | 0 | −0.1857j |
| 1 | *0.0646j* | −0.0695j | *0.0725j* | −0.0735j | *0.0725j* | −0.0694j | *0.0646j* |
| 2 | 0 | 0 | 0 | 0 | 0 | 0 | 0 |

TABLE 3

SRRC prototype filter $Q_{0,0}^{p,q}$ values for p = [−2, 2], q = [−3, 3], K = 16, and α = 2/K = 0.125.

| | | | | q | | | |
|---|---|---|---|---|---|---|---|
| p | −3 | −2 | −1 | 0 | 1 | 2 | 3 |
| −2 | −0.2055j | 0 | 0 | 0 | 0 | 0 | −0.2055j |
| −1 | *0.0356j* | 0.0362j | *0.0366j* | 0.0367j | *0.0366j* | 0.0362j | *0.0356j* |
| 0 | −0.2055j | 0 | 0.6345j | $Q_{0,0}^{0,0}=1$ | −0.6345j | 0 | −0.2055j |
| 1 | *0.0356j* | −0.0362j | *0.0366j* | −0.0367j | *0.0366j* | −0.0362j | *0.0356j* |
| 2 | 0 | 0 | 0 | 0 | 0 | 0 | 0 |

Therefore, choosing the SRRC filter, especially with longer overlapping factors, significantly reduces the filter response samples representing co-polarized intrinsic interference (italicized filter time-frequency locations). From these Tables, one can recognize that the majority of the intrinsic interference results from the temporally adjacent symbols (on the same subcarrier, p=0 and q=−1, 1), which is why the DP-FBMC Structure II is not effective in removing the intrinsic interference. Hence, if Structure II is used, even with dual polarization, one needs intrinsic interference cancellation techniques for channel equalization, such as those in conventional FBMC. Henceforth, only results for Structures I and III are shown.

Figure 5:
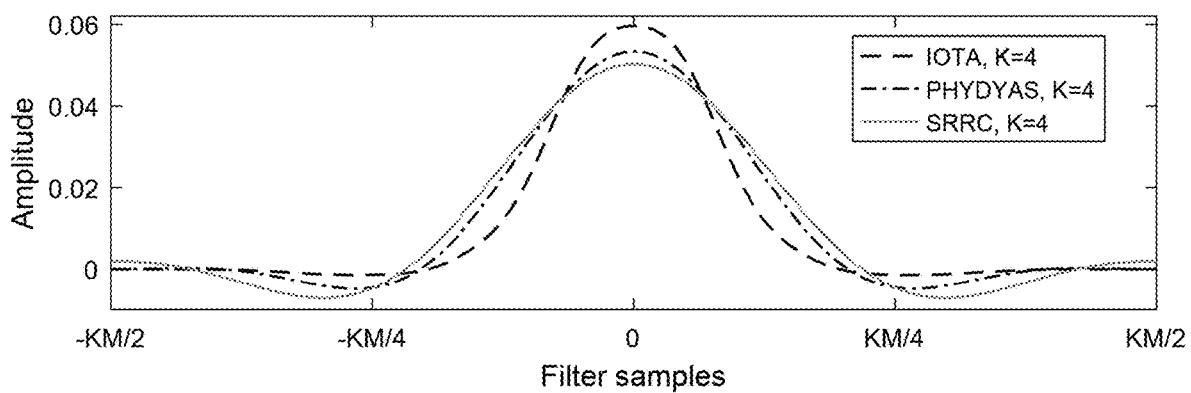
FIG. 5 graphically represents PHYDYAS, IOTA, and SRRC prototype filter impulse responses for K=4.

For illustration, FIG. 5 plots the normalized energy prototype filter impulse response (IR) for several frequently used prototype filters with same K=4.

Another tool to illustrate the prototype filter characteristic in the time-frequency plane is the ambiguity function[3], $$A_h(\tau, v) = \int_{-\infty}^{\infty} h\left(t + \frac{\tau}{2}\right) h^*\left(t - \frac{\tau}{2}\right) e^{-2\pi vt} dt, \quad (9)$$

where $\tau$ is a time delay and $v$ is a frequency shift.

Figure 6:
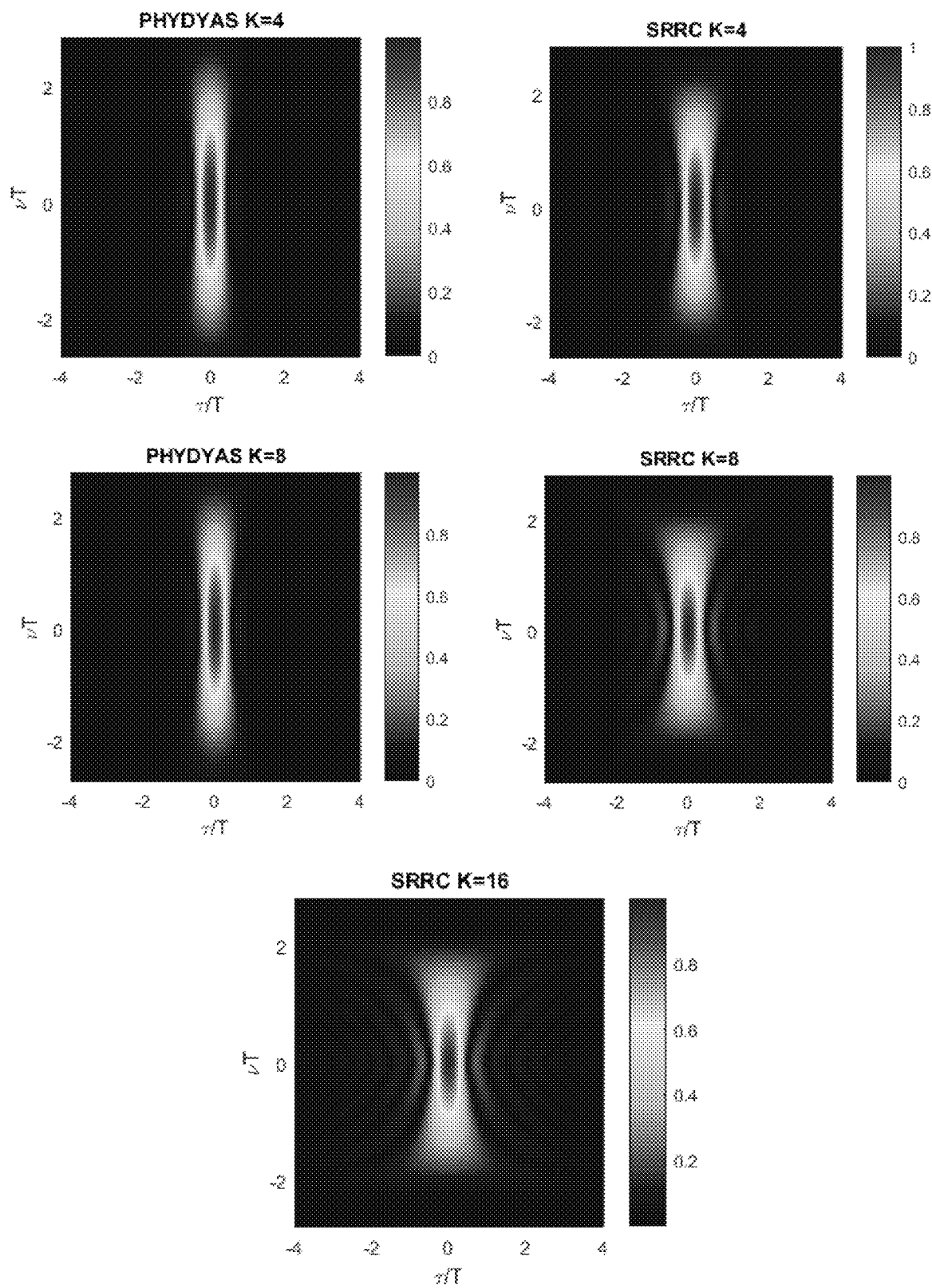
FIG. 6 graphically represents ambiguity functions for PHYDYAS and SRRC prototype filters, with K values variously equal to 4, 8, or 16, as indicated.

FIG. 6 graphically represents ambiguity functions for PHYDYAS and SRRC prototype filters, with K values variously equal to 4, 8, or 16, as indicated. Thus, FIG. 6 shows the ambiguity functions of the PHYDYAS and SRRC filters with different overlapping factors. The PHYDAS filter has a more compact response in the time domain whereas the SRRC is more compact in frequency. Comprehensive studies of prototype filters are available in the literature[34].

The polarization multiplexed OQAM symbols are defined for the different DP-FBMC Structures for n=[0, N−1], m=[−∞, ∞]. Equations (10), (11), and (12) express the multiplexed OQAM symbols for DP-FBMC Structures I, II, and III, respectively, $$a_{n,m}^H = \begin{cases} a_{n,m} & m \text{ even} \\ 0 & m \text{ odd} \end{cases} \quad (10)$$

$$a_{n,m}^V = \begin{cases} a_{n,m} & m \text{ odd} \\ 0 & m \text{ even} \end{cases}$$

$$a_{n,m}^H = \begin{cases} a_{n,m} & n \text{ even} \\ 0 & n \text{ odd} \end{cases} \quad (11)$$

$$a_{n,m}^V = \begin{cases} a_{n,m} & n \text{ odd} \\ 0 & n \text{ even} \end{cases}$$

$$a_{n,m}^H = \begin{cases} a_{n,m} & m \text{ even}, n \text{ even} \\ 0 & m \text{ even}, n \text{ odd} \\ 0 & m \text{ odd}, n \text{ even} \\ a_{n,m} & m \text{ odd}, n \text{ odd} \end{cases} \quad (12)$$

$$a_{n,m}^V = \begin{cases} 0 & m \text{ even}, n \text{ even} \\ a_{n,m} & m \text{ even}, n \text{ odd} \\ a_{n,m} & m \text{ odd}, n \text{ even} \\ 0 & m \text{ odd}, n \text{ odd} \end{cases}$$

Using Eqs. (10)-(12), one can express the transmitted waveforms on each polarization in Eq. (13). Note that one can also use circular right-handed and left-handed (or any other) orthogonal polarizations, but here, the H and V notations for horizontal and vertical polarizations.

$$x^H(t) = \sum_{n=0}^{N-1} \sum_{m \in \mathbb{Z}} a_{n,m}^H h\left(t - m\frac{T}{2}\right) e^{\frac{j\pi nt}{T}} e^{j\theta_{n,m}} \quad (13)$$

$$x^V(t) = \sum_{n=0}^{N-1} \sum_{m \in \mathbb{Z}} a_{n,m}^V h\left(t - m\frac{T}{2}\right) e^{\frac{j\pi nt}{T}} e^{j\theta_{n,m}}$$

Figure 7A:
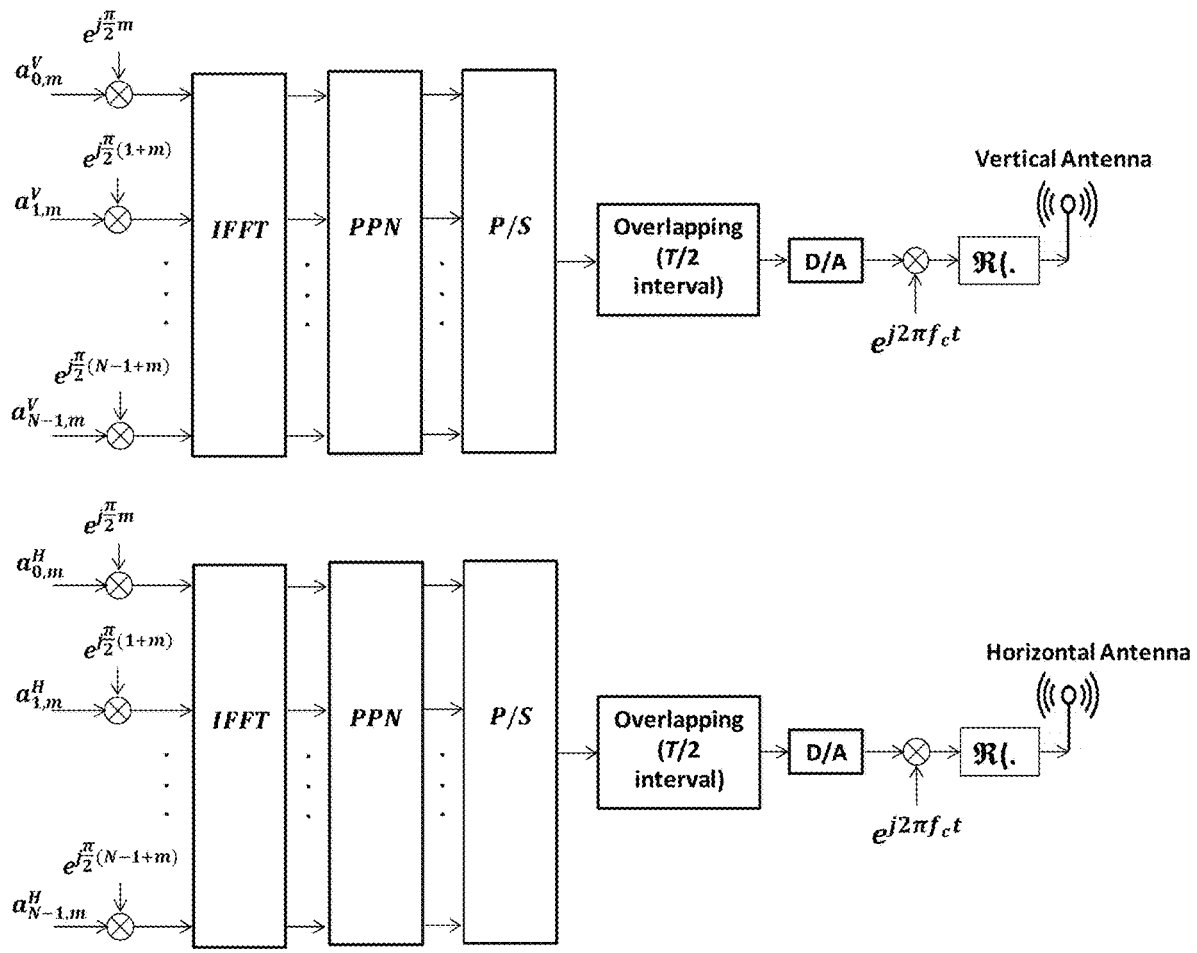
FIG. 7A is a schematic representation of an exemplary embodiment of a presently disclosed DP-FBMC communication system transmitter for Structures II and III, as referenced herein.
Figure 7B:
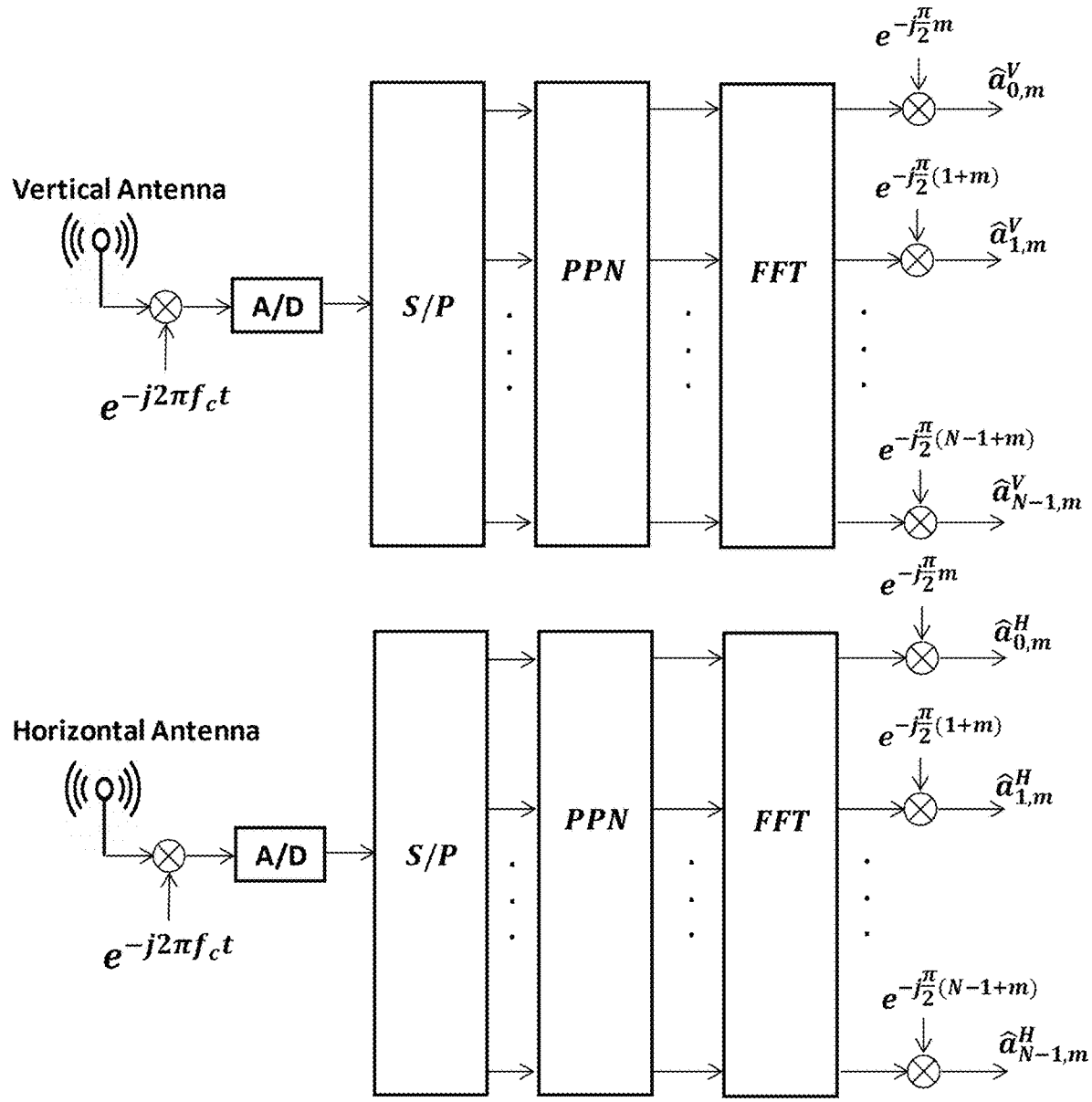
FIG. 7B is a schematic representation of an exemplary embodiment of a presently disclosed DP-FBMC communication system receiver for Structures II and III, as referenced herein.

FIGS. 7A and 7B collectively show the presently disclosed DP-FBMC communication system block diagram for each polarization. More specifically, FIG. 7A is a schematic representation of an exemplary embodiment of a presently disclosed DP-FBMC communication system transmitter for Structures II and III as referenced herein; and FIG. 7B is a schematic representation of an exemplary embodiment of a presently disclosed DP-FBMC communication system receiver for Structures II and III as referenced herein. Such Figures apply to presently disclosed DP-FBMC Structures II and III, noting that for Structure I, only one IFFT and FFT at transmitter and receiver is needed, which is an advantage with respect to complexity.

This disclosure briefly compares the complexity of these Structures with that of conventional FBMC. First, considering the direct Equation forms of (1) and (13), one can find that in DP-FBMC Structures II and III, for each symbol period, the number of multiplications is reduced by a factor of two on each polarization as long as the input symbols on half the subcarriers are zero. Therefore, the complexity of the DP-FBMC transmitter is similar to that of conventional FBMC. DP-FBMC Structure I also has complexity similar to that of conventional FBMC (based on the direct form).

If one looks at the fast implementation of the systems based on FIGS. 1 and 7, one can deduce that presently disclosed DP-FBMC Structures II and III need a second IFFT and FFT at both transmitter and receiver. Second, at every symbol time, half of the subcarrier samples is zero so only half the subcarrier samples are needed at the receiver; therefore, one can use the pruned IFFT/FFT algorithms[26]-[28] to reduce the added complexity. Based on Skinner's algorithms[27], pruning the vector of input samples with length N/2 for an N-point IFFT requires $2N \log_2(N/2)$ real multiplications and $3N \log_2(N/2)+N$ real additions. Based on Markel's algorithm[26], pruning output samples with length N/2 of an N-point FFT requires $2N \log_2(N/4)$ real multiplications and $3N \log_2(N/2)$ real additions[8]. The pruned IFFT/FFT is effective for a small number of subcarriers (e.g., less than 32), but for a large number of subcarriers, this complexity reduction is not effective. After IFFT/FFT processing (Structures II and III) for PPN filtering, one also needs twice the multiplications of conventional FBMC. Therefore, DP-FBMC Structures II and III have higher complexity than conventional FBMC. For Structure I, as long as one can share the same IFFT/FFT at every symbol period and polarization, one can have the same complexity as conventional FBMC.

Regarding the transmit power in all Structures, as long as half the symbols are nulled accordingly, each DP-FBMC antenna employs half the power of conventional FBMC, hence lower cost power amplifiers may be used. Received SNR or the energy per bit ($E_b$) to noise density ratio $E_b/N_0$ remains constant.

III. Simulation Results

This Section compares the performance of CP-OFDM, conventional FBMC, and DP-FBMC via computer simulations. BER performance is evaluated in different example channels, PAPR, and the effects of carrier time and frequency offsets. It also compares the PSD of DP-FBMC using different prototype filters and overlapping factors. In addition, it evaluates the performance of DP-FBMC in the presence of polarization angular mismatch and realistic values of XPD.

Figure 8A:
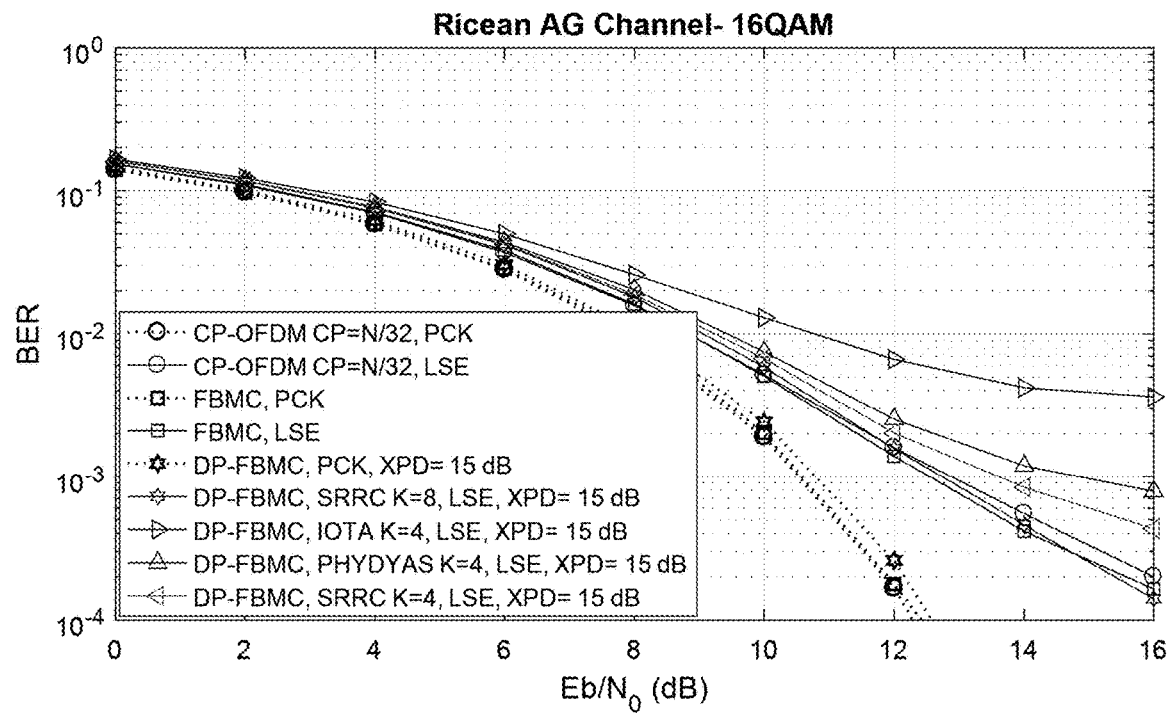
FIG. 8A graphically represents BER vs. $Eb/N_0$ for QPSK, 16-QAM modulations using least-square (LS) channel estimation, and perfect channel knowledge (PCK) equalization per an over-water AG channel.
Figure 8B:
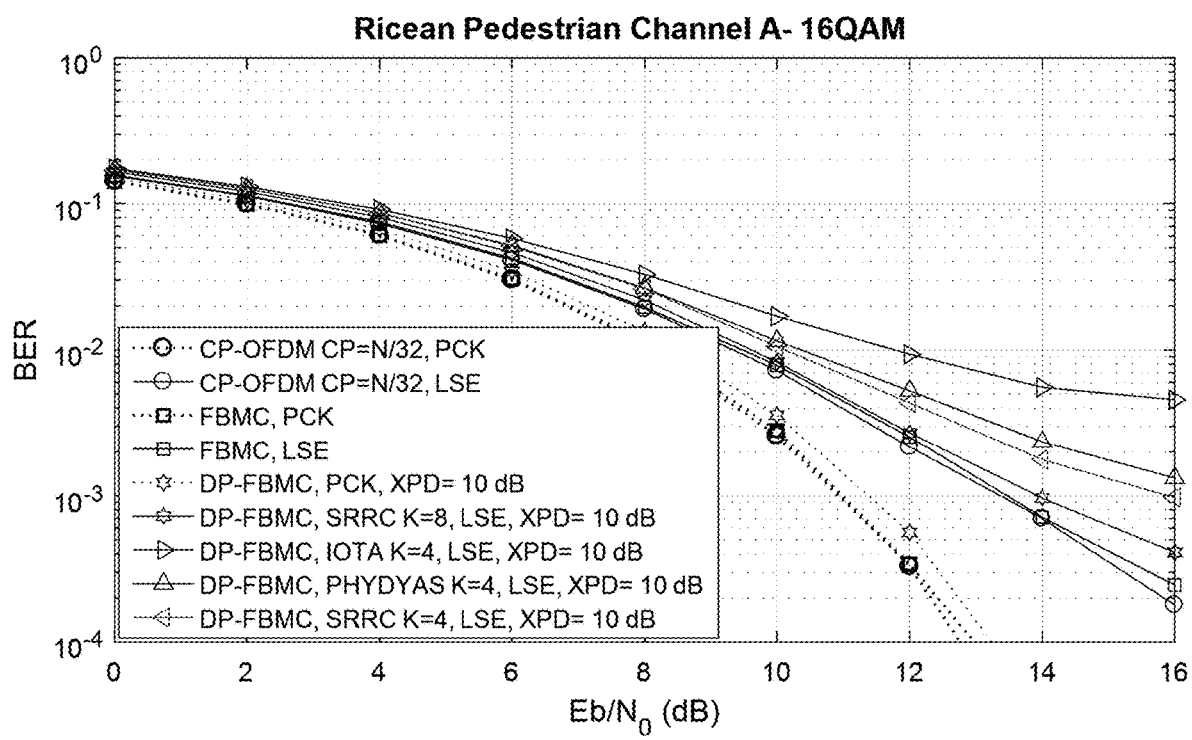
FIG. 8B graphically represents BER vs. $Eb/N_0$ for QPSK, 16-QAM modulations using least-square (LS) channel estimation, and perfect channel knowledge (PCK) equalization per an ITU pedestrian A channel.
Figure 8C:
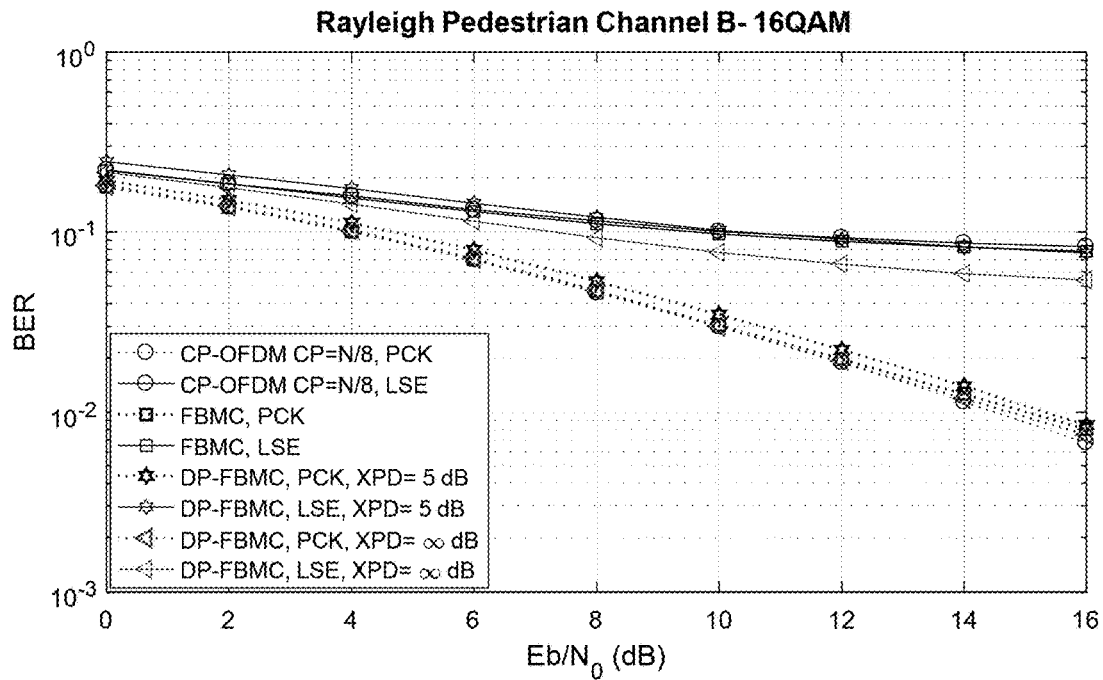
FIG. 8C graphically represents BER vs. $Eb/N_0$ for QPSK, 16-QAM modulations using least-square (LS) channel estimation, and perfect channel knowledge (PCK) equalization per an ITU pedestrian B channel.

FIGS. 8A through 8C show the BER vs. $E_b/N_0$ for CP-OFDM, FBMC and DP-FBMC communication systems for modulation 16-QAM for three example channels. More specifically, FIG. 8A graphically represents BER vs. $E_b/N_0$ for 16-QAM modulation using least-square (LS) channel estimation, and zero-forcing based on perfect channel knowledge (PCK) channel equalizations per an over-water AG channel; FIG. 8B graphically represents BER vs. $E_b/N_0$ for 16-QAM modulation using LS, and zero-forcing based on PCK channel equalizations per an ITU pedestrian A channel; and FIG. 8C graphically represents BER vs. $E_b/N_0$ for 16-QAM modulation using LS, and zero-forcing based on PCK channel equalizations per an ITU pedestrian B channel.

Note that Structures I or III yield to similar BER results, and thus, only the Structure I BER results are shown here. In these simulations, there is no channel coding and one can chose N=512 subcarriers, 16 symbols per frame, and a channel bandwidth B=10 MHz. Recall that on DP-FBMC Structures I and III, adjacent symbols are separated on two orthogonal polarizations; therefore, it is expected the ISI caused from channel multipath delays will be lower than in conventional FBMC.

As mentioned for the multipath channel fading models, three different tapped delay line (TDL) models were used for three different scenarios. The first channel model is an over-water strong line of sight (LOS) air-to-ground (AG) channel model based on NASA measurement results[29]. The second and third channels are the pedestrian channel A and B from ITU-R Recommendation M.1225[30] (note that the simulation results for the distortionless AWGN channel perfectly fit theoretical results; hence, those results are also skipped here). Table 4 lists the multipath power delay profiles for these channel models along with root-mean-square delay-spread (RMS-DS) values and fading models. In the analysis and the BER performance simulation results, these channels represent mildly dispersive, dispersive, and highly dispersive channels. Ricean fading with Rice factor 30 dB is used for the strong LOS AG channel. For the pedestrian A channel, the first tap has Ricean fading with K=10 dB, with the remaining taps incurring Rayleigh fading. All taps in the pedestrian B channel incur Rayleigh fading. In the simulations, the transmitted signal is subject to slow fading for all cases. For example, at a 5 GHz carrier frequency and maximum velocity of 300 m/s for the AG case, the maximum Doppler shift is $f_D=v/\lambda=5$ kHz. Doppler spreads for the slower moving terrestrial platforms are orders of magnitude smaller. The channel coherence time, denoted $T_c$, is inversely proportional to Doppler spread; therefore, for the AG case, $T_c \cong 0.2$ ms. Thus, as long as the 10 MHz bandwidth signal sample period is much smaller than $T_c$, the transmitted symbols are subjected to slow fading. In BER simulations, one can assume that any Doppler shifts are tracked and fully compensated at the receiver.

In the CP-OFDM transmitter, one can ensure that the CP length is longer than the maximum delay spread of the multipath fading channel. This yields 1/32 of symbol period for the AG and pedestrian channel A, and 1/8 of symbol period for pedestrian channel B. In all communication systems, 33 subcarriers are used as a typical number for guard band (17 on the left and 16 on the right of the signal spectrum). In addition, a null DC subcarrier is used at the center of the spectrum. For channel estimation, there are 30 equally spaced subcarriers (in frequency) every 4 symbol periods as scattered pilots in all systems. For this pilot-based channel estimation, LS based on discrete Fourier transform (DFT)-based interpolation techniques are used[35]. For the pilot-based channel estimation in conventional FBMC, the auxiliary pilot technique is used[15] *and assigned* 1 auxiliary pilot symbol adjacent to each pilot symbol; p=[−2, 2], q=[−2, 3] is chosen for calculating the intrinsic interference $Q_{n,m}^{p,q}$ values. Note that the total number of pilot symbols (including auxiliary symbols in FBMC) for channel equalization in all systems is the same; hence, the number of data symbols of all systems are identical. For DP-FBMC, the auxiliary pilot symbol locations of conventional FBMC are allocated on the other polarization; therefore, conventional FBMC and DP-FBMC have the same total number of allocated symbols for channel equalization. For the conventional FBMC simulations, one can chose the widely used PHYDYAS prototype filter for this system with K=4[24]. This prototype filter is of interest in conventional FBMC because of its good time-frequency localization. For DP-FBMC, the SRRC filter was used with different overlapping factors K=4 and 8 as well as PHYDYAS K=4 for comparison. As a reminder in these simulations, SRRC is used with roll-off factor $\alpha=2/K$.

TABLE 4

Power delay profile, RMS-DS values, and fading models of example channel models.

| Tap | AG LOS Channel | | Pedestrian Channel A | | Pedestrian Channel B | |
|---|---|---|---|---|---|---|
| | $\tau$(ns) | $\overline{P}$(dB) | $\tau$(ns) | $\overline{P}$(dB) | $\tau$(ns) | $\overline{P}$(dB) |
| 1 | 0 | 0 | 0 | 0 | 0 | 0 |
| 2 | 45 | −12 | 110 | −9.7 | 200 | −0.9 |
| 3 | 200 | −22.3 | 190 | −19.2 | 800 | −4.9 |
| 4 | | | 410 | −22.8 | 1200 | −8 |
| 5 | | | | | 2300 | −7.8 |
| 6 | | | | | 3700 | −23.9 |
| RMS-DS (ns) | ≅18 | | ≅46 | | ≅633 | |
| Fading | Ricean (Rice factor 30 dB) | | Ricean (Rice factor 10 dB) | | Rayleigh | |

According to the BER results, DP-FBMC has similar BER results as conventional FBMC and CP-OFDM with SRRC K=8, without using any intrinsic interference mitigation technique that is required for conventional FBMC. Therefore, one does not need intrinsic interference mitigation in DP-FBMC. Note that for smaller K, such as K=4, DP-FBMC has slightly worse BER performance due to the higher intrinsic interference. Thus, a K larger than 4 is required to better remove the intrinsic interference. Also note that for these results, practical XPD values were used (i.e., 15 dB for AG channel, 10 dB for pedestrian channel A, and 5 dB for pedestrian channel B) for each of these environments based on measurement results from the literature.

Figure 9:
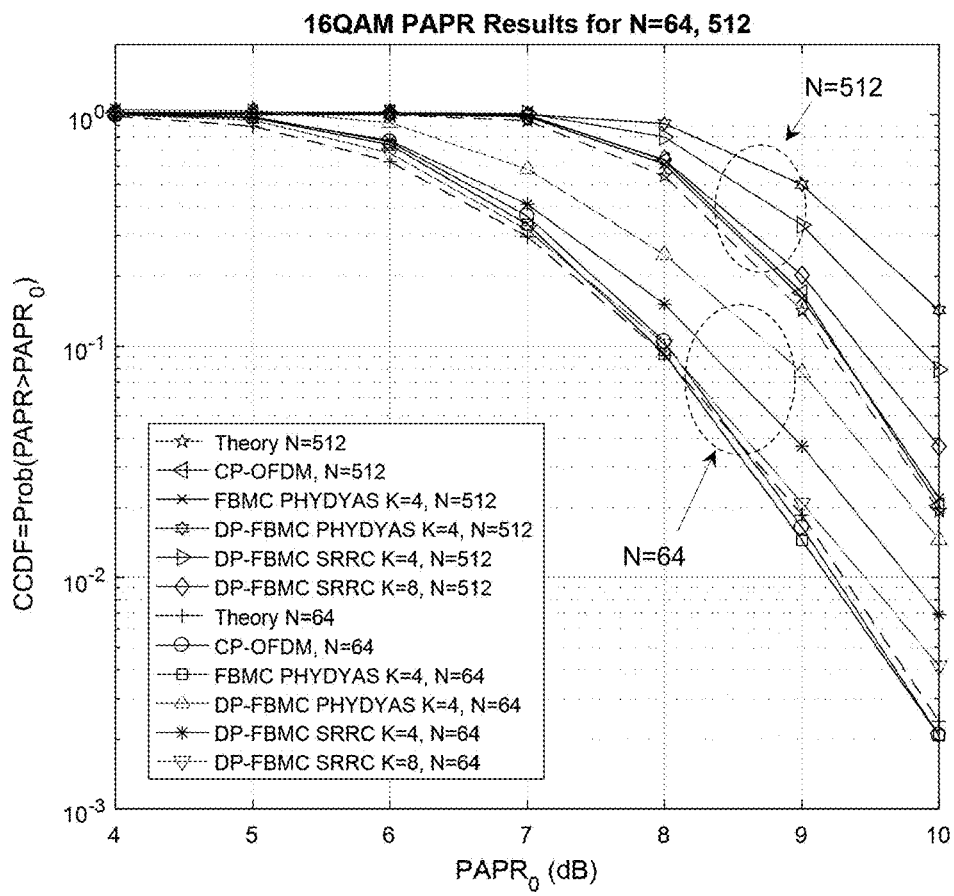
FIG. 9 graphically represents CCDF vs. $PAPR_0$ comparison using different waveforms and prototype filters, for 16QAM and N=64, 512.

FIG. 9 graphically represents CCDF vs. $PAPR_0$ comparison using different waveforms and prototype filters, for 16QAM and N=64, 512.

FIG. 9 with different K-factors and prototype filters compares simulated PAPR results of DP-FBMC Structure I and CP-OFDM and FBMC. The PAPR complementary cumulative distribution functions (CCDFs) for two values of the number subcarriers N=64 and 512 are shown. This Figure also includes the theoretical result (i.e., dashed curves) for comparison[33].

In the presently disclosed DP-FBMC Structure I, all the subcarriers of adjacent symbols are separated on two polarizations; thus, one should expect PAPR degradation. Note that Structures II and III do not have this issue because all the symbols are present for the entire frame period; therefore, their PAPR results are exactly the same as CP-OFDM and conventional FBMC. Hence, these PAPR results only show the DP-FBMC waveform PAPR based on Structure I.

As observed, SRRC filter has the advantage of improving the PAPR in DP-FBMC Structure I compared to the PHYDYAS filter because of the larger side lobes of the impulse response in the time domain (FIG. 5), which can improve the PAPR, with longer SRRC prototype filters further improving the PAPR. Thus, according to these PAPR results, DP-FBMC has poor PAPR for K=4, and by increasing K, the PAPR comes closer to that of CP-OFDM and conventional FBMC. These results also include the DP-FBMC with PHYDYAS prototype filter and K=4. As can be seen, DP-FBMC with the PHYDYAS filter has even poorer PAPR.

Figure 10A:
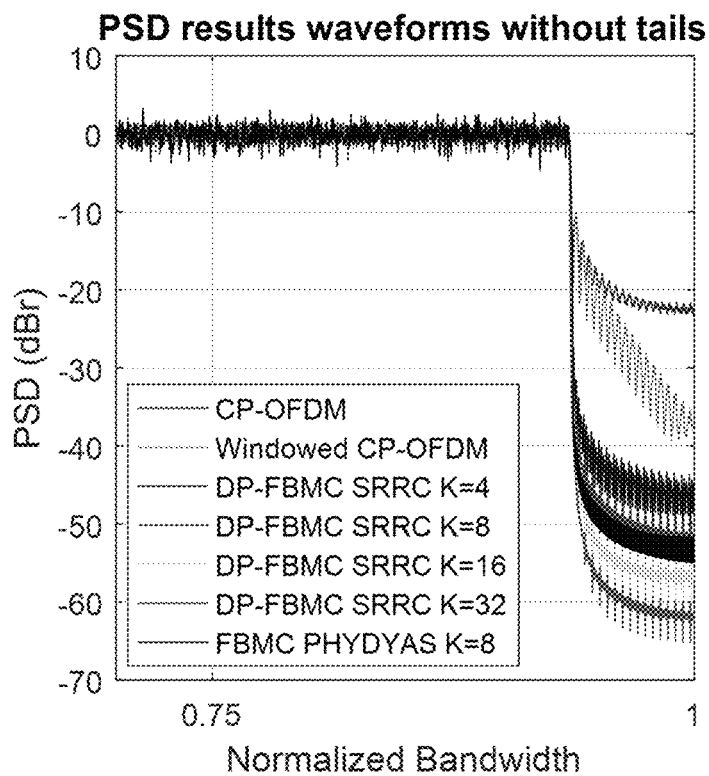
FIG. 10A graphically represents PSD vs. normalized bandwidth for waveforms without filter tails.
Figure 10B:
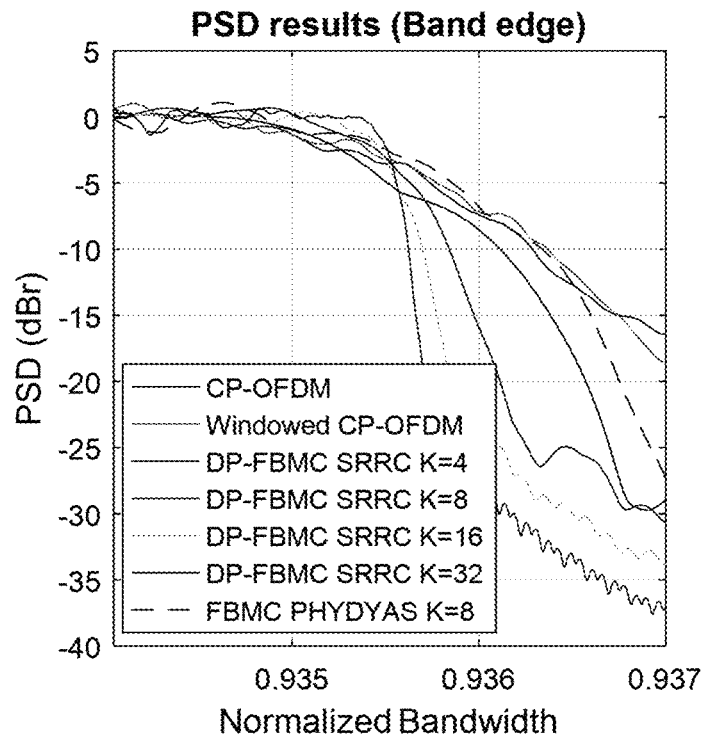
FIG. 10B graphically represents PSD vs. normalized bandwidth around the band edge portion of FIG. 10A.
Figure 10C:
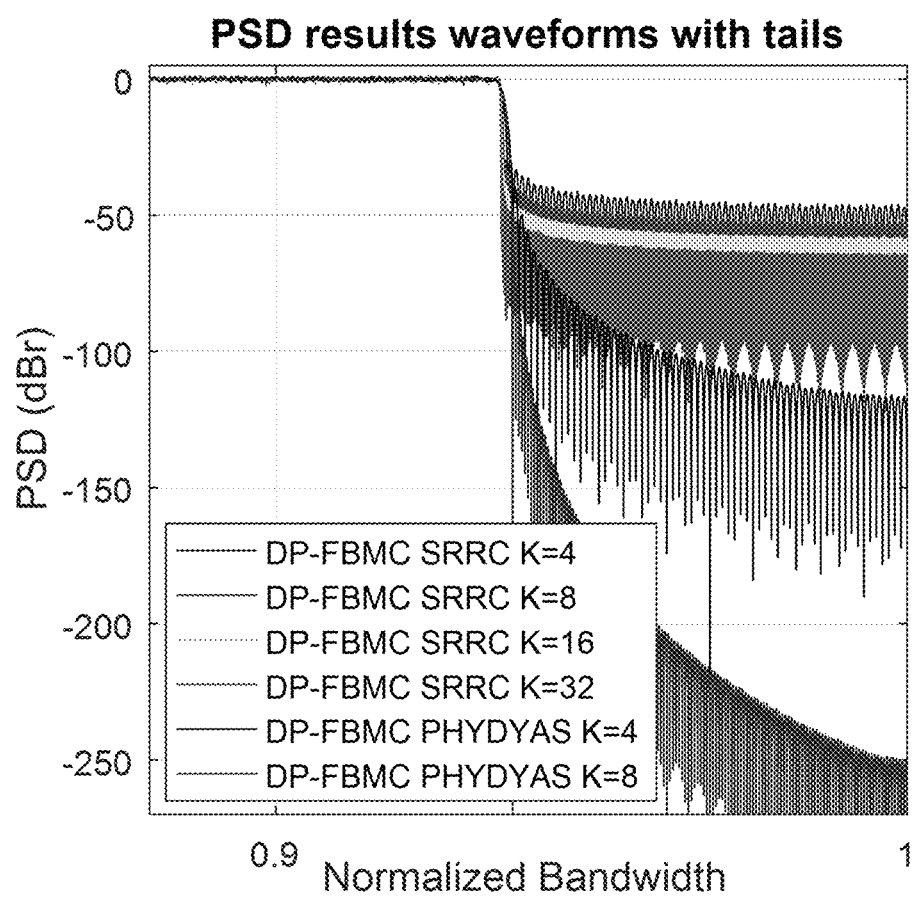
FIG. 10C graphically represents PSD vs. normalized bandwidth for waveforms including tails.

FIGS. 10A through 10C compare the power spectral density (PSD) of these three systems obtained via the periodogram technique. In particular, FIG. 10A graphically represents PSD vs. normalized bandwidth for waveforms without filter tails. FIG. 10B graphically represents PSD vs. normalized bandwidth for around the band edge view of FIG. 10A. FIG. 10C graphically represents PSD vs. normalized bandwidth for waveforms including filter tails.

Note that one can calculate these PSD results after removing the two ends of FBMC and DP-FBMC waveforms (resulting from filter tails) in order to reduce the frame lengths and improve the spectral efficiency. Therefore, the first (K/2−1)N and last (K/2−1)N samples of each frame are truncated on both conventional FBMC and DP-FBMC waveforms. Note that for all FBMC systems this is the maximum acceptable truncation and that further truncation will yield BER degradation. FIG. 10A also shows the PSD of CP-OFDM with and without windowing. In CP-OFDM, windowing is used to reduce the out-of-band power. For the windowed CP-OFDM, one can also use a raised cosine (RC) window. As expected, lengthening the filter (increasing K) using SRRC yields smaller out-of-band power. For K=8, conventional FBMC with the PHYDYAS filter has a few dB lower PSD than DP-FBMC using SRRC filter at band edges (normalized bandwidth=1).

FIG. 10C also shows the PSDs without truncation for comparison, and as expected, the PHYDYAS filter has the best result. FIG. 10B plots the spectra of FIG. 10A around the band edge. As expected, using SRRC filters with larger overlapping factors (K) yields more compact power spectral densities. Thus, after truncation DP-FBMC has a more compact PSD than conventional FBMC for the same K.

Figure 11A:
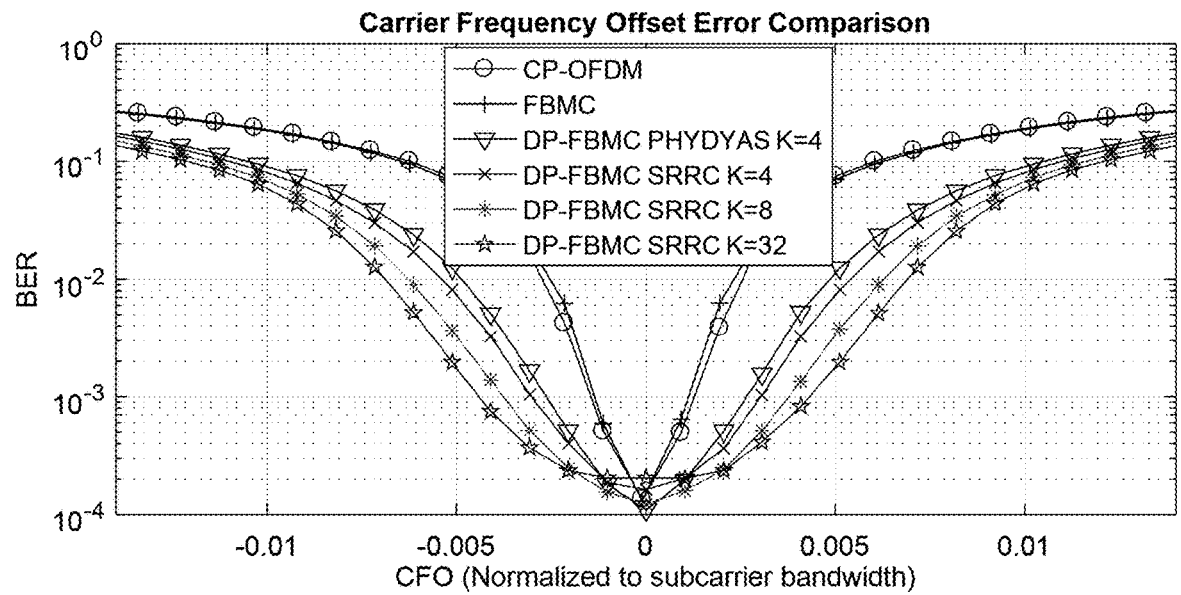
FIG. 11A graphically represents BER vs. carrier frequency offset (CFO) for AWGN channel, $Eb/N_0$=12 dB, 16-QAM, 512 subcarriers, and B=5 MHz.
Figure 11B:
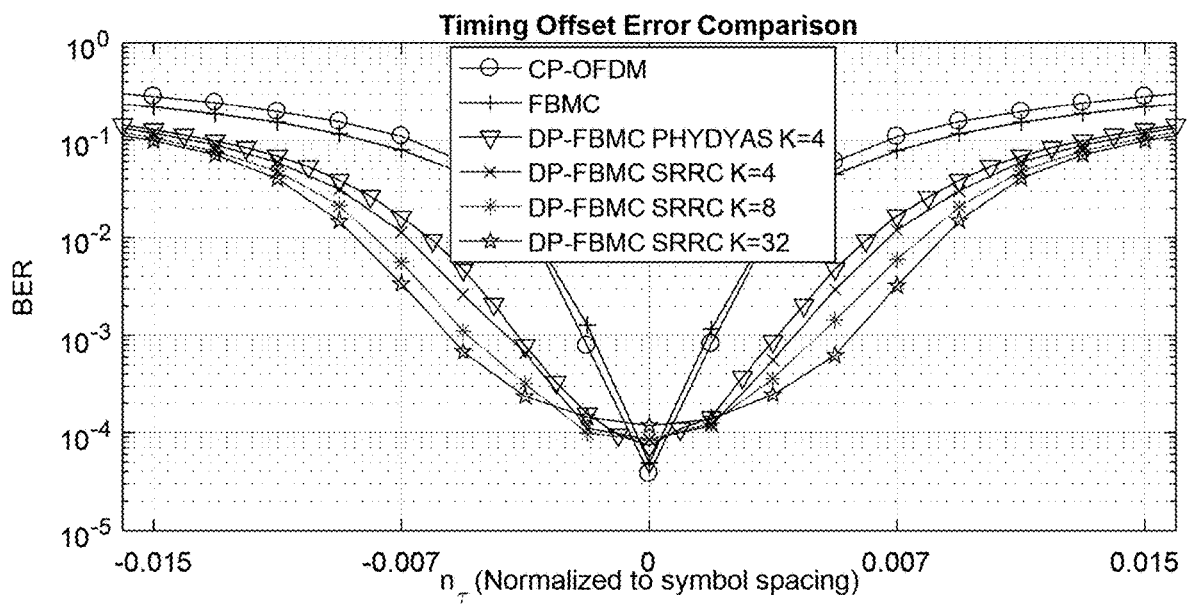
FIG. 11B graphically represents BER vs. Timing offset $n_T$ for AWGN channel, $Eb/N_0$=12 dB, 16-QAM, 512 subcarriers, and B=5 MHz.

FIGS. 11A and 11B show BER vs. carrier frequency and timing offsets at the receiver, respectively. In particular, FIG. 11A graphically represents BER vs. carrier frequency offset (CFO) for AWGN channel, $E_b/N_0$=12 dB, 16-QAM, 512 subcarriers, and B=5 MHz; and FIG. 11B graphically represents BER vs. Timing offset ($n_r$) for AWGN channel, $E_b/N_0$=12 dB, 16-QAM, 512 subcarriers, and B=5 MHz.

Comparing these results with prior results[31], [32] here, the outcome is found to be consistent for FBMC and CP-OFDM, noting that the BER is simulated in an AWGN channel with 16-QAM modulation and $E_b/N_0$=12 dB with 512 subcarriers and the frame structure has 16 symbols per frame. The CFO values are normalized to the subcarrier bandwidth and timing offset values are normalized to symbol spacing. A channel bandwidth B=5 MHz was chosen. These results illustrate the better performance of DP-FBMC in different frequency and timing offsets. Note that longer overlapping factors in DP-FBMC yield better BER performance versus CFO and TO.

To further analyze the effect of imperfect XPD on DP-FBMC performance one can consider two other scenarios. In the first scenario, one can assume no XP interference due to imperfect antennas or rich scattering channel environments, but instead, only assume an angular mismatch between the two (linear) polarizations. Therefore, at each $\theta^0$ angular mismatch, the received electromagnetic wave amplitudes are scaled by factors of $\cos(\theta°)$ and $\sin(\theta°)$ multiplying the desired (co-) and undesired (cross-) polarization components, respectively.

Figure 12A:
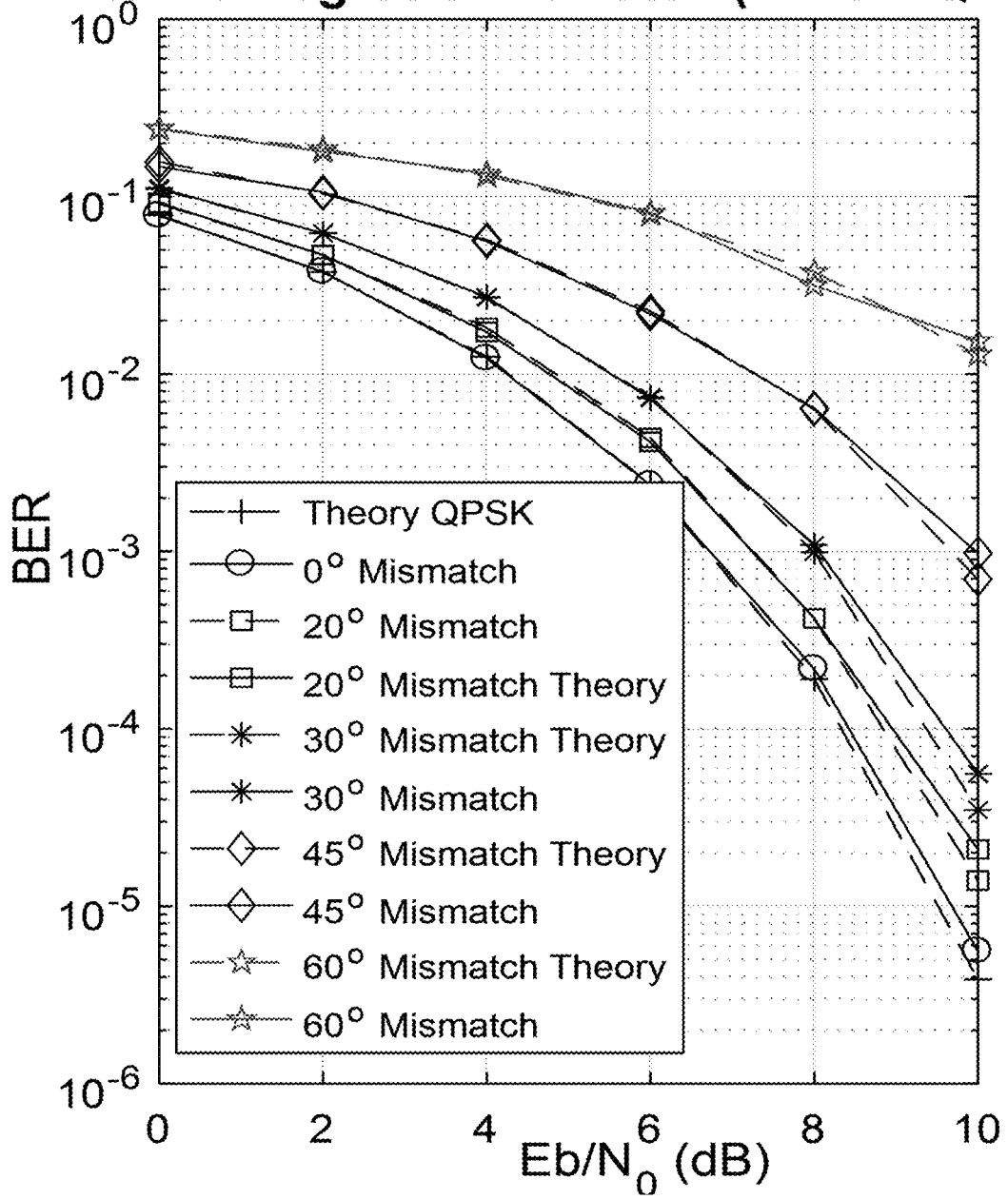
FIG. 12A graphically represents BER vs. $Eb/N_0$ in different angular mismatch, AWGN channel, for QPSK modulation.
Figure 12B:
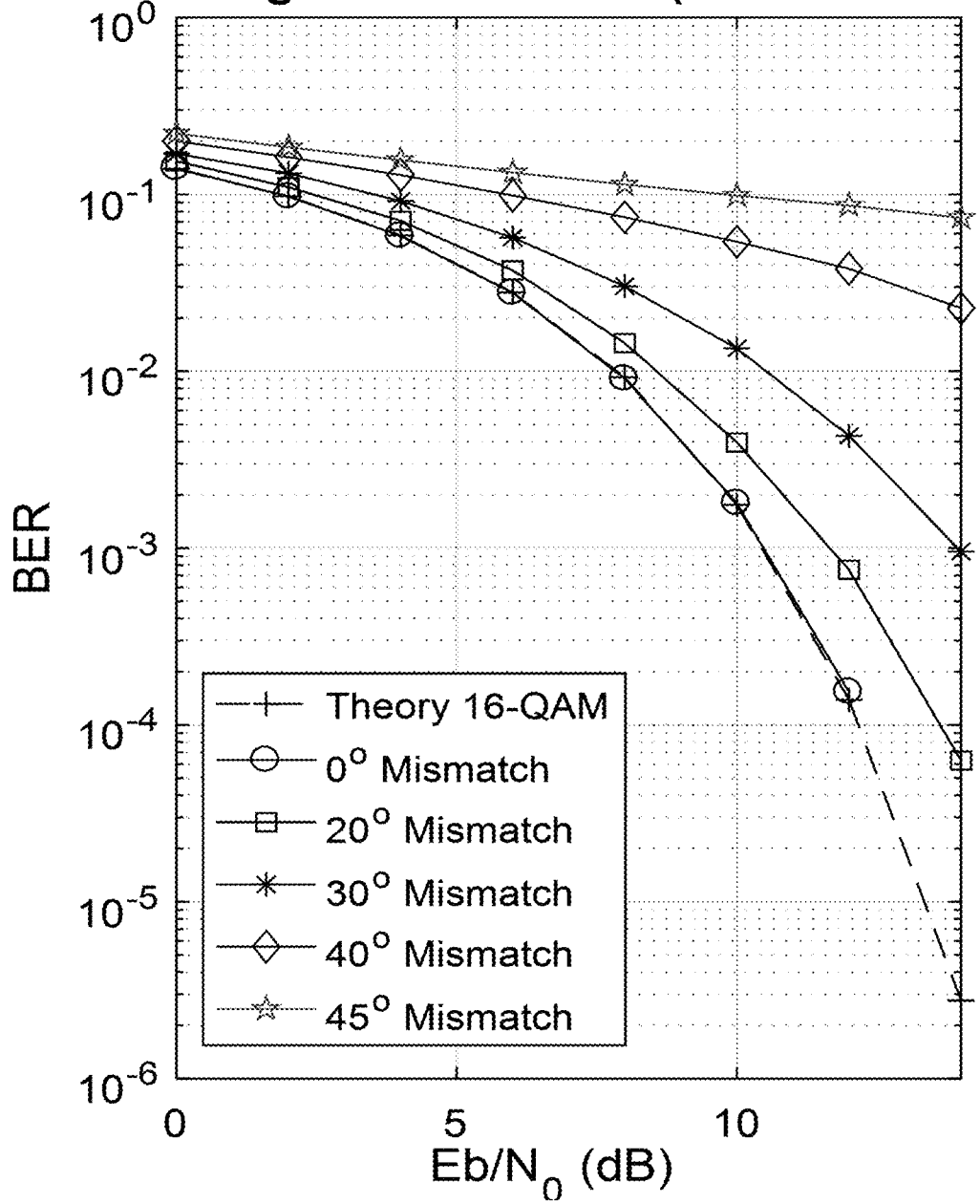
FIG. 12B graphically represents BER vs. $Eb/N_0$ in different angular mismatch, AWGN channel, for 16-QAM modulation.
Figure 12C:
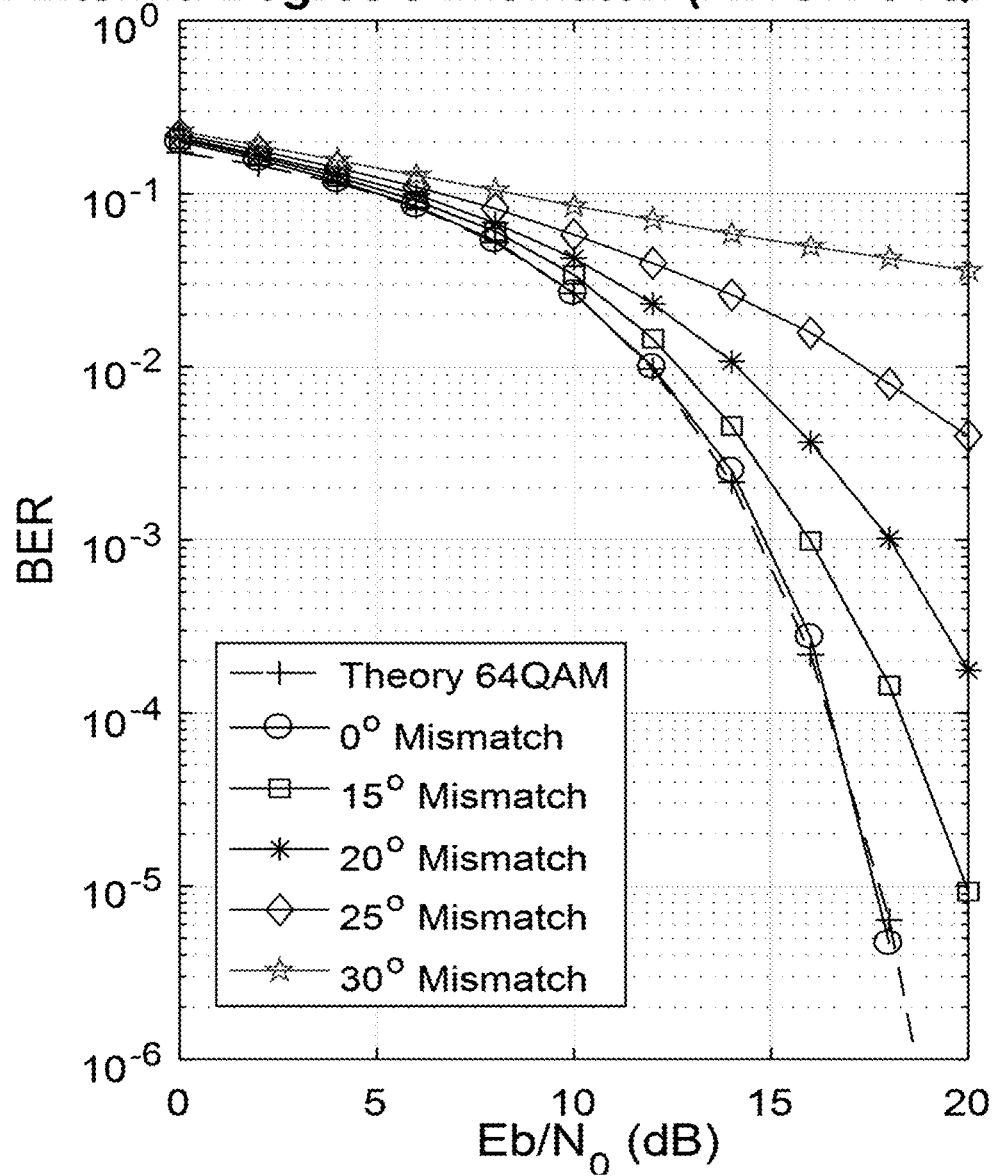
FIG. 12C graphically represents BER vs. $Eb/N_0$ in different angular mismatch, AWGN channel, for 64-QAM modulation.

FIGS. 12A through 12C show the BER vs. $E_b/N_0$ results for different modulation orders in an AWGN channel (similar results for DP-FBMC Structures I and III). More specifically, FIG. 12A graphically represents BER vs. $E_b/N_0$ in different angular mismatch, AWGN channel, per QPSK modulation. FIG. 12B graphically represents BER vs. $E_b/N_0$ in different angular mismatch, AWGN channel, per 16-QAM modulation. FIG. 12C graphically represents BER vs. $E_b/N_0$ in different angular mismatch, AWGN channel, per 64-QAM modulation.

Using low modulation orders such as QPSK, DP-FBMC has acceptable performance even at polarization angular mismatches up to 45° (with a few dB loss in SNR), and this happens because of the $\pi/2$ phase shifts ($\theta_{n,m}$) between symbols according to Eq. (13). Based on these results, the tolerance of the DP-FBMC system decreases for higher order modulations. In order to mitigate the interference from polarization mismatch, one can use polarization interference cancellation (XPIC) techniques at the receivers. Naturally, this improves performance at the expense of complexity.

The theoretical results for QPSK modulation are also shown in FIG. 12A. In this case, the signal to interference plus noise ratio (SINR) equals $SNR-10\log(1+\tan^2(\theta°))$ dB, where the subtracted term is the cross-polarization interference caused by the $\theta°$ angular mismatch. For other modulation orders, cross-polarization interference calculation is not as straightforward as QPSK.

In a second scenario, one can simulate the BER performance for several practical XPD values from 1 to 20 dB using actual pilot-based LS channel estimation for 16-QAM modulations. Here, one can assume there is no XP due to angular mismatch, or $\theta$-0°.

One can express the XPD in the following equation forms for two cross-polarization cases on each antenna, $$XPD = \frac{E\{|h^{VV}|^2\}}{E\{|h^{HV}|^2\}} = \frac{E\{|h^{HH}|^2\}}{E\{|h^{VH}|^2\}}, \quad (14)$$

where $h^{VV}$, $h^{HH}$ are the narrowband co-polarization channel responses between co-polarized antennas, and $h^{HV}$, $h^{VH}$ are the cross-polarized channel responses.

Figure 13:
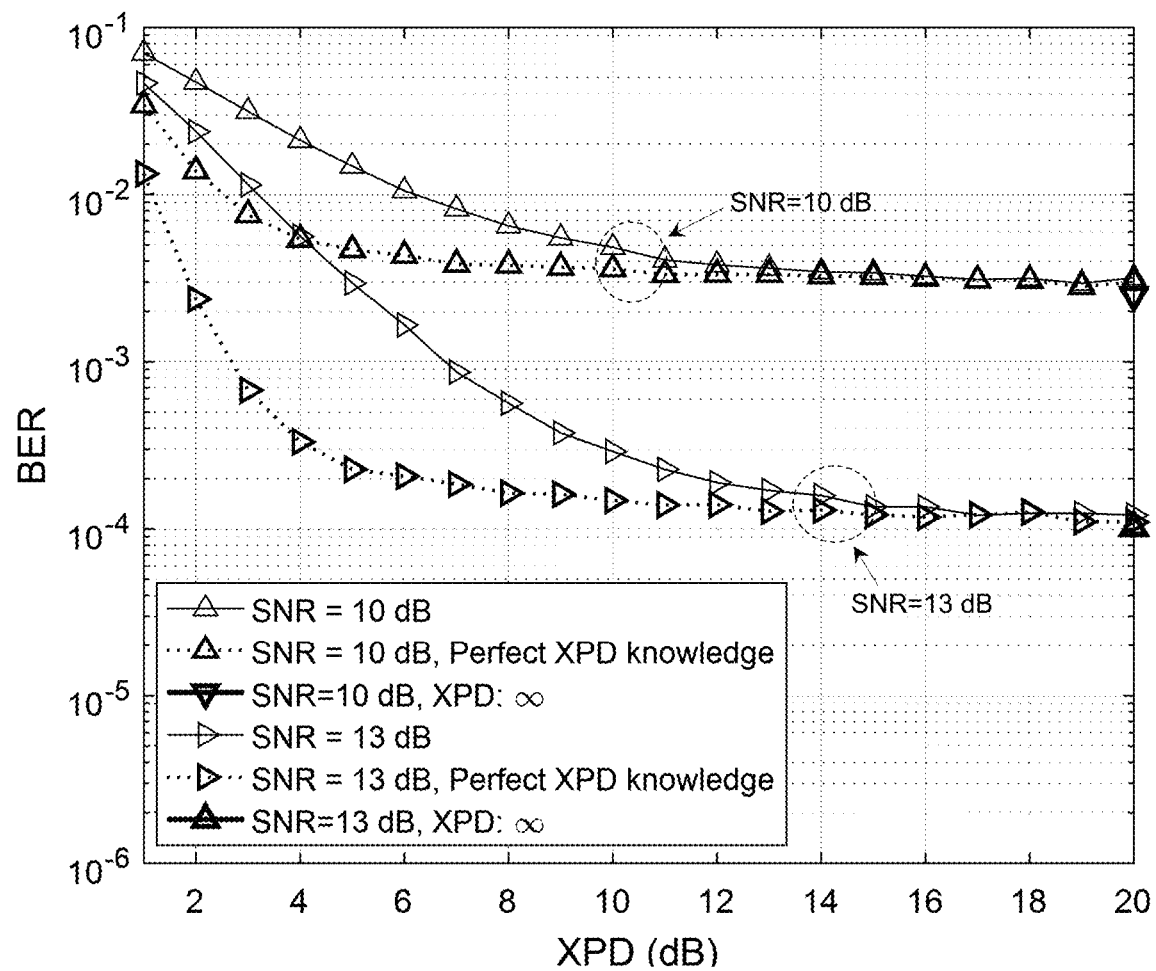
FIG. 13 graphically represents BER vs. XPD for 16-QAM modulation orders in ITU pedestrian channel A, with $Eb/N_0$=10 dB and 13 dB, SRRC filter with K=8, with results including perfect XPD knowledge.

In FIG. 13, simulation results for BER vs. XPD are shown assuming $h^{VV}=h^{HH}$ and $h^{HV}=h^{VH}$. FIG. 13 graphically represents BER vs. XPD for 16-QAM modulation in ITU pedestrian channel A, with $E_b/N_0$=10 dB and 13 dB.

Here, the multipath channel models used is the pedestrian channel A with bandwidth 10 MHz, and N=512 subcarriers. Other physical layer parameters are identical to those used in FIGS. 8A through 8C. Here, for the SRRC prototype filter, one can chose K=8. The results provided also assume perfect XPD knowledge (cross-coupling interference cancellation at the receiver for comparison). As anticipated, smaller cross-polarization discrimination degrades the performance, although practical XPD values of greater than 10 dB for pedestrian A channel yield performance near the ideal XPD case even without XPD knowledge and cancellation.

This disclosure discusses a new FBMC system based on a dual polarization multiplexing technique. The disclosure shows that using specific time, frequency, and polarization multiplexing Structures, one can significantly suppress the intrinsic imaginary interference in conventional FBMC systems. In practical XPD conditions, DP-FBMC provides better reliability and performance than conventional FBMC, particularly for more dispersive channels. Therefore, the required intrinsic imaginary interference mitigation techniques for conventional FBMC are no longer required for the proposed DP-FBMC system.

While the presently disclosed subject matter has been described in detail with respect to specific embodiments thereof, it will be appreciated that those skilled in the art, upon attaining an understanding of the foregoing, may readily produce alterations to, variations of, and equivalents to such embodiments. Accordingly, the scope of the presently disclosed subject matter is by way of example rather than by way of limitation, and the subject disclosure does not preclude inclusion of such modifications, variations and/or additions to the presently disclosed subject matter as would be readily apparent to one of ordinary skill in the art.

REFERENCES

[1] B. Le Floch, M. Alard and C. Berrou, "Coded orthogonal frequency division multiplex [TV broadcasting]," in *Proceedings of the IEEE*, vol. 83, no. 6, pp. 982-996, June 1995.

[2] P. Siohan, C. Siclet and N. Lacaille, "Analysis and design of OFDM/OQAM systems based on filterbank theory," *IEEE Transactions on Signal Processing*, vol. 50, no. 5, pp. 1170-1183, May 2002.

[3] B. Farhang-Boroujeny, "OFDM Versus Filter Bank Multicarrier," *IEEE Signal Processing Magazine*, vol. 28, no. 3, pp. 92-112, May 2011.

[4] B. Farhang-Boroujeny and C. H. Yuen, "Cosine modulated and offset QAM filter bank multicarrier techniques: a continuous-time prospect," *EURASIP J. Advances in Signal Process.*, vol. 2010, Jan. 2010.

[5] B. Farhang-Boroujeny, "Filter Bank Multicarrier Modulation: A Waveform Candidate for 5G and Beyond," *Hindawi, Advances in Electrical Engineering*, vol. 2014, Article ID 482805, 25 pages, 2014.

[6] B. Saltzberg, "Performance of an Efficient Parallel Data Transmission System," in *IEEE Transactions on Communication Technology*, vol. 15, no. 6, pp. 805-811, December 1967.

[7] F. Schaich and T. Wild, "Waveform contenders for 5G—OFDM vs. FBMC vs. UFMC," *6th International Symposium on Communications, Control and Signal Processing (ISCCSP)*, Athens, 2014, pp. 457-460.

[8] R. Zakaria and D. Le Ruyet, "A Novel Filter-Bank Multicarrier Scheme to Mitigate the Intrinsic Interference: Application to MIMO Systems," *IEEE Transactions on Wireless Communications*, vol. 11, no. 3, pp. 1112-1123, March 2012.

[9] C. Kim, Y. H. Yun, K. Kim and J. Y. Seol, "Introduction to QAM-FBMC: From Waveform Optimization to System Design," in *IEEE Communications Magazine*, vol. 54, no. 11, pp. 66-73, November 2016.

[10] X. Zhang, L. Chen, J. Qiu and J. Abdoli, "On the Waveform for 5G," in *IEEE Communications Magazine*, vol. 54, no. 11, pp. 74-80, November 2016.

[11] International Telecommunications Union (ITU), Report ITU-R M.2175, "Simultaneous dual linear polarization transmission technique using digital cross-polarization cancellation for MSS systems," July 2010.

[12] P. D. Arapoglou, P. Burzigotti, M. Bertinelli, A. Bolea Alamanac and R. De Gaudenzi, "To MIMO or Not To MIMO in Mobile Satellite Broadcasting Systems," in

*IEEE Transactions on Wireless Communications*, vol. 10, no. 9, pp. 2807-2811, September 2011.
[13] F. Horlin, J. Fickers, P. Emplit, A. Bourdoux, and J. Louveaux, "Dual-polarization OFDM-OQAM for communications over optical fibers with coherent detection," *Optics Express* 21, 6409-6421 (2013).
[14] E. Giacoumidis, M. Jarajreh, S. Sygletos, S. Le, F. Farjady, A. Tsokanos, A. Hamié, E. Pincemin, Y. Jaouën, A. Ellis, and N. Doran, "Dual-polarization multi-band optical OFDM transmission and transceiver limitations for up to 500 Gb/s uncompensated long-haul links," *Optics Express* 22, pp. 10975-10986 (2014).
[15] J. P. Javaudin, D. Lacroix and A. Rouxel, "Pilot-aided channel estimation for OFDM/OQAM," *The 57th IEEE Semiannual Vehicular Technology Conference*, 2003. VTC 2003-Spring., 2003, pp. 1581-1585 vol. 3.
[16] C. Lele, R. Legouable and P. Siohan, "Channel estimation with scattered pilots in OFDM/OQAM," *IEEE 9th Workshop on Signal Processing Advances in Wireless Communications*, Recife, 2008, pp. 286-290, 2008.
[17] C. Lele, P. Siohan, R. Legouable and J. P. Javaudin, "Preamble-based channel estimation techniques for OFDM/OQAM over the powerline," *IEEE International Symposium on Power Line Communications and its Applications*, Pisa, 2007, pp. 59-64, 2007.
[18] R. Nissel and M. Rupp, "Enabling Low-Complexity MIMO in FBMC-OQAM," *IEEE Globecom Workshops (GC Wkshps)*, Washington, D.C., pp. 1-6, 2016.
[19] T. Ihalainen, A. Ikhlef, J. Louveaux and M. Renfors, "Channel Equalization for Multi-Antenna FBMC/OQAM Receivers," *IEEE Transactions on Vehicular Technology*, vol. 60, no. 5, pp. 2070-2085, June 2011.
[20] U. Jayasinghe, N. Rajatheva and M. Latva-aho, "Application of a leakage based precoding scheme to mitigate intrinsic interference in FBMC," *IEEE International Conference on Communications (ICC)*, Budapest, 2013, pp. 5268-5272.
[21] Y. Cheng, P. Li and M. Haardt, "Coordinated beamforming for the multi-user MIMO downlink using FBMC/OQAM," *6th International Symposium on Communications, Control and Signal Processing (ISCCSP)*, Athens, 2014, pp. 465-469.
[22] J. Wang, Y. Zhang, H. Zhao, L. Li, H. Long and H. Shen, "A Novel QAM-FBMC without Intrinsic Time-Domain Interference," *IEEE 84th Vehicular Technology Conference (VTC-Fall)*, Montreal, Q C, 2016, pp. 1-6.
[23] J. Wang, H. Zhao, Y. Zhang, F. Li and L. Zhao, "Intrinsic Interference Elimination for Preamble-Based Channel Estimation in FBMC Systems," *IEEE Globecom Workshops (GC Wkshps)*, Washington, D C, 2016, pp. 1-5.
[24] L. Häring, "Intrinsic interference-aware adaptive FBMC transmission with automatic modulation classification," *17th International Symposium on Communications and Information Technologies (ISCIT)*, Cairns, Q L D, 2017, pp. 1-6.
[25] M. Bellanger, et al. "FBMC physical layer: a primer." PHYDYAS, no. 4, January 2010. [Online]. Available: http://www.ict-phydyas.org/teamspace/internal-folder/FBMC-Primer_06-2010.pdf
[26] J. Markel, "FFT pruning," in *IEEE Transactions on Audio and Electroacoustics*, vol. 19, no. 4, pp. 305-311, December 1971.
[27] D. Skinner, "Pruning the decimation in-time FFT algorithm," in *IEEE Transactions on Acoustics, Speech, and Signal Processing*, vol. 24, no. 2, pp. 193-194, April 1976.
[28] H. V. Sorensen and C. S. *Burrus*, "Efficient computation of the DFT with only a subset of input or output points," in IEEE Transactions on Signal Processing, vol. 41, no. 3, pp. 1184-1200, March 1993.
[29] D. W. Matolak and R. Sun, "Air—Ground Channel Characterization for Unmanned Aircraft Systems—Part I: Methods, Measurements, and Models for Over-Water Settings," in *IEEE Transactions on Vehicular Technology*, vol. 66, no. 1, pp. 26-44, January 2017.
[30] International Telecommunications Union (ITU), Report ITU-R M.1225, "Guidelines for evaluation of radio transmission technologies for IMT-2000," February 1997.
[31] D. Mattera, M. Tanda, M. Bellanger, "Frequency domain CFO compensation for FBMC systems," *Signal Processing, Science Direct*, Volume 114, Pages 183-197, ISSN 0165-1684, 2015.
[32] D. Mattera, M. Tanda, M. Bellanger, "Performance analysis of some timing offset equalizers for FBMC/OQAM systems," *Signal Processing, Science Direct*, Volume 108, Pages 167-182, ISSN 0165-1684, 2015.
[33] T. Jiang, M. Guizani, H. H. Chen, W. Xiang and Y. Wu, "Derivation of PAPR Distribution for OFDM Wireless Systems Based on Extreme Value Theory," in *IEEE Transactions on Wireless Communications*, vol. 7, no. 4, pp. 1298-1305, April 2008.
[34] A. Sahin, I. Guvenc, and H. Arslan, "A Survey on Multicarrier Communications: Prototype Filters, Lattice Structures, and Implementation Aspects," *IEEE Communications Surveys & Tutorials*, vol. 16, no. 3, pp. 1312-1338, Third Quarter 2014.
[35] Y. S. Cho, J. Kim, W. Y. Yang, and C. G. Kang, *MIMO-OFDM Wireless Communications with MATLAB*. Singapore: John Wiley & Sons (Asia) Pte Ltd, 2010.

What is claimed is:

1. A method of transmitting data via a filterbank multi-carrier (FBMC) communication system, the method comprising:
   receiving a plurality of information symbols;
   encoding an N×M array containing the plurality of information symbols into a dual-polarization array of modulation symbols;
   filtering the dual-polarization array of modulation symbols using filters with near Nyquist characteristics;
   transmitting the filtered dual-polarization array of modulation symbols using two mutually orthogonal waveforms respectively transmitted via respective antenna, whereby FBMC intrinsic interference is relatively suppressed;
   the method further including using a square-root raised cosine (SRRC) filter or other similar filter;
   wherein said SRRC filter has an overlapping factor K with a roll-off factor $\alpha=2/K$, where the overlapping factor K is a number of multicarrier symbols that overlap in the time domain; and
   wherein N and M are each integers greater than zero.

2. The method as in claim 1, wherein said respective antenna comprise two non-interfering antennas for transmission.

3. The method as in claim 2, wherein said two non-interfering antennas comprise respective vertical and horizontal polarization antennas or any other orthogonal polarization types or left/right-handed circular polarizations.

4. The method as in claim 1, wherein said communication system is used for wireless communication links including at least one of terrestrial, indoor, outdoor, air-to-ground, satellite, and vehicular.

5. The method as in claim 1, further including subsequently receiving transmitted orthogonal waveforms.

6. The method as in claim 1, wherein said encoding including using at least one of time-polarization division multiplexing (TPDM), frequency-polarization division multiplexing (FPDM), and time-frequency-polarization division multiplexing (TFPDM).

7. The method as in claim 6, further including using TPDM to separate adjacent FBMC symbols on two orthogonal polarizations multiplexed in time.

8. The method as in claim 7, wherein said TPDM uses a single inverse fast Fourier transform (IFFT) for encoding the N×M array into the dual-polarization array for said transmitting.

9. The method as in claim 7, further including subsequently receiving transmitted orthogonal waveforms using a single fast Fourier transform (FFT).

10. The method as in claim 6, further including using FPDM to separate adjacent subcarriers on two orthogonal polarizations multiplexed in frequency.

11. The method as in claim 10, wherein said FPDM uses a pair of respective inverse fast Fourier transforms (IFFT) for encoding the N×M array into the dual-polarization array for said transmitting on respective vertical and horizontal polarization antennas.

12. The method as in claim 10, further including subsequently receiving transmitted orthogonal waveforms using a pair of respective fast Fourier transforms (FFT) for receiving on respective vertical and horizontal polarization antennas.

13. The method as in claim 6, further including using TFPDM to isolate symbols on two orthogonal polarizations multiplexed both in time and frequency.

14. The method as in claim 13, wherein said TFPDM uses a pair of respective inverse fast Fourier transforms (IFFT) for encoding the N×M array into the dual-polarization array for said transmitting on respective vertical and horizontal polarization antennas.

15. The method as in claim 13, further including subsequently receiving transmitted orthogonal waveforms using a pair of respective fast Fourier transforms (FFT) for receiving on respective vertical and horizontal polarization antennas.

16. The method as in claim 13, further including transmitting two halves of a real offset quadrature amplitude modulation (OQAM) symbols on two orthogonal polarizations at every symbol time, and then subsequently switching the order of half the subcarriers on the two polarizations at the next symbol time, so that every other subcarrier is transmitted on a given polarization and the order is switched at each symbol interval.

17. A data transmission device, comprising:
a wireless transmitter;
a pair of respective transmission antenna associated with the wireless transmitter;
a processor; and
a memory including program code executable by the processor, the program code including code for causing the processor to:
receive a plurality of information symbols;
encode an N×M array containing the plurality of information symbols into a dual-polarization array of modulation symbols, with the encode using at least one of time-polarization division multiplexing (TPDM), frequency-polarization division multiplexing (FPDM), and time-frequency-polarization division multiplexing (TFPDM); and transmit the dual-polarization array of modulation symbols using two mutually orthogonal waveforms respectively transmitted via said pair of respective transmission antenna;
wherein N and M are each integers greater than zero.

18. The data transmission device as in claim 17, wherein said pair of respective transmission antenna comprise two non-interfering antennas for transmission.

19. The data transmission device as in claim 18, wherein said two non-interfering antennas comprise respective vertical and horizontal polarization antennas, or other orthogonally polarized antennas, or left- and right-hand circularly polarized antennas.

20. The data transmission device as in claim 17, further combined with a receiver for subsequently receiving transmitted orthogonal waveforms.

21. The data transmission device as in claim 17, further including a filter for filtering the dual-polarization array of modulation symbols and having near Nyquist characteristics.

22. The data transmission device as in claim 21, wherein said filter comprises a square-root raised cosine (SRRC) filter or other similar filter.

23. The data transmission device as in claim 22, wherein said SRRC filter has an overlapping factor K with a roll-off factor $\alpha=2/K$, where the overlapping factor K is a number of multicarrier symbols that overlap in the time domain.

24. The data transmission device as in claim 17, further including at least a single inverse fast Fourier transform (IFFT).

25. The data transmission device as in claim 17, further including:
a pair of respective inverse fast Fourier transforms (IFFT); and
wherein said pair of respective transmission antenna comprise respective vertical and horizontal polarization antennas.

26. A method of communicating data via a filterbank multicarrier (FBMC) communication system, the method comprising:
receiving a plurality of information symbols;
encoding an N×M array containing the plurality of information symbols into a dual-polarization array of modulation symbols;
transmitting the dual-polarization array of modulation symbols using two mutually orthogonal waveforms respectively transmitted via respective antenna; and
subsequently receiving transmitted orthogonal waveforms;
wherein said encoding uses at least one of time-polarization division multiplexing (TPDM), frequency-polarization division multiplexing (FPDM), and time-frequency-polarization division multiplexing (TFPDM); and
N and M are each integers greater than zero.

27. The method as in claim 26, wherein said respective antenna comprise two non-interfering antennas for transmission and two non-interfering antennas for receiving.

28. The method as in claim 27, wherein said two transmission antennas comprise respective vertical and horizontal polarization or other orthogonally polarized antennas, and said two receiving antennas comprise respective vertical and horizontal polarization or other orthogonally polarized antennas.

29. The method as in claim 26, wherein said communication system is used for wireless communication links including at least one of terrestrial, indoor, outdoor, air-to-ground, satellite, and vehicular.

30. A filterbank multicarrier (FBMC) data communications system, comprising:
a wireless transmitter;
a receiver;
a pair of respective transmission antenna associated with the wireless transmitter;
a pair of respective receiving antenna associated with the receiver;
a processor; and
a memory including program code executable by the processor, the program code including code for causing the processor to:
receive a plurality of information symbols;
encode an N×M array containing the plurality of information symbols into a dual-polarization array of modulation symbols, with the encode using at least one of time-polarization division multiplexing (TPDM), frequency-polarization division multiplexing (FPDM), and time-frequency-polarization division multiplexing (TFPDM);
transmit the dual-polarization array of modulation symbols using two mutually orthogonal waveforms respectively transmitted via said pair of respective transmission antenna; and
subsequently receive transmitted orthogonal waveforms via said pair of respective receiving antenna; and
wherein N and M are each integers greater than zero.

31. The FBMC data communications system as in claim 30, wherein said respective antenna comprise two non-interfering antennas for transmission and two non-interfering antennas for receiving.

32. The FBMC data communications system as in claim 31, wherein said pair of two transmission antennas comprise respective vertical and horizontal polarization antennas or other orthogonally polarized, and said two receiving antennas comprise respective vertical and horizontal polarization or other orthogonally polarized antennas.

33. The FBMC data communications system as in claim 30, wherein said FBMC data communication system is connected with wireless communication links associated with at least one of terrestrial, indoor, outdoor, air-to-ground, satellite, and vehicular.

34. A method of communicating data over a communication channel, the method comprising:
receiving two mutually orthogonal waveforms on respective vertical and horizontal polarization or other orthogonally polarized receiver antennas;
demodulating the two orthogonal waveforms to recover an estimate of a two-dimensional array of modulation symbols; and
decoding the two-dimensional array of modulation symbols in order to generate an estimate of an N×M array containing a plurality of information symbols, the N×M array having been encoded prior to transmission of the orthogonal waveforms by using at least one of time-polarization division multiplexing (TPDM), frequency-polarization division multiplexing (FPDM), and time-frequency-polarization division multiplexing (TFPDM); and
wherein N and M are each integers greater than zero.

35. The method as in claim 34, further including:
receiving a plurality of information symbols;
encoding an N×M array containing the plurality of information symbols into a dual-polarization array of modulation symbols; and
transmitting the dual-polarization array of modulation symbols using two mutually orthogonal waveforms respectively transmitted on respective vertical and horizontal polarization or other orthogonally polarized transmitter antennas.

36. The method as in claim 35, wherein said encoding includes using at least one of time-polarization division multiplexing (TPDM), frequency-polarization division multiplexing (FPDM), and time-frequency-polarization division multiplexing (TFPDM).

37. An apparatus for communicating data over a communication channel, the apparatus comprising:
a receiver front end, the receiver front end being configured to receive two mutually orthogonal waveforms;
a demodulator configured to generate an estimate of a two-dimensional array of modulation symbols; and
a decoder operative for performing an inverse of encoding of an N×M array containing a plurality of information symbols, the N×M array having been encoded prior to transmission of the orthogonal waveforms by using at least one of time-polarization division multiplexing (TPDM), frequency-polarization division multiplexing (FPDM), and time-frequency-polarization division multiplexing (TFPDM); and
wherein N and M are each integers greater than zero.

38. The apparatus as in claim 37, further including respective vertical and horizontal polarization receiver antennas for receiving two mutually orthogonal waveforms.

39. The apparatus as in claim 37, further including:
a transmitter front end for receiving a plurality of information symbols;
a pair of respective vertical and horizontal polarization transmitter antennas; and
an encoder for encoding an N×M array containing the plurality of information symbols into a dual-polarization array of modulation symbols;
wherein said transmitter is further operative for transmitting the dual-polarization array of modulation symbols using two mutually orthogonal waveforms respectively transmitted on said respective vertical and horizontal polarization or other orthogonally polarized transmitter antennas.

40. The apparatus as in claim 39, wherein said encoder is operative for encoding using at least one of time-polarization division multiplexing (TPDM), frequency-polarization division multiplexing (FPDM), and time-frequency-polarization division multiplexing (TFPDM).

* * * * *